(12) United States Patent
Jin et al.

(10) Patent No.: US 8,709,306 B2
(45) Date of Patent: Apr. 29, 2014

(54) THERMOCHROMIC MICROPARTICLES, DISPERSIONS THEREOF, AND MANUFACTURING METHOD THEREOF, AS WELL AS LIGHT-MODULATING COATINGS, LIGHT-MODULATING FILMS AND LIGHT-MODULATING INKS

(75) Inventors: Ping Jin, Aichi (JP); Shidong Ji, Aichi (JP); Masato Tazawa, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 368 days.

(21) Appl. No.: 12/999,117

(22) PCT Filed: May 21, 2009

(86) PCT No.: PCT/JP2009/059360
§ 371 (c)(1),
(2), (4) Date: Dec. 15, 2010

(87) PCT Pub. No.: WO2010/001669
PCT Pub. Date: Jan. 7, 2010

(65) Prior Publication Data
US 2011/0095242 A1    Apr. 28, 2011

(30) Foreign Application Priority Data

Jun. 30, 2008 (JP) .................................. 2008-171531
Apr. 20, 2009 (JP) .................................. 2009-102373

(51) Int. Cl.
*C09K 9/00*    (2006.01)

(52) U.S. Cl.
USPC ........................................................ 252/583

(58) Field of Classification Search
USPC ........................... 252/583; 428/432, 701, 702
See application file for complete search history.

(56) References Cited

U.S. PATENT DOCUMENTS

| 6,358,307 B1 | 3/2002 | Legrand et al. |
| 2003/0054177 A1 | 3/2003 | Jin |
| 2003/0162895 A1 * | 8/2003 | Gaggar et al. ............. 525/70 |
| 2003/0196454 A1 | 10/2003 | Jin |

FOREIGN PATENT DOCUMENTS

| JP | 2735147 | 1/1998 |
| JP | 10-508573 | 8/1998 |
| JP | 2003-094551 | 4/2003 |
| JP | 2004-004795 | 1/2004 |
| JP | 2004-346260 | 12/2004 |
| JP | 2004-346261 | * 12/2004 |
| JP | 3849008 | 9/2006 |
| JP | 2007-326276 | 12/2007 |
| WO | WO2007/142154 | 12/2007 |

OTHER PUBLICATIONS

Jitae Park, In Hwan Oh, Eunmo Lee, Kyu Won Lee, Cheol Eui Lee, Kyung Song, Youn-Joong Kim, Structure and magnetism in VO2 nanorods, Appl. Phys. Lett., 2007, vol. 91, No. 15, p. 153112/1-153112/3.
Zhou Gui, et al:Chem.Mater.14(2002)5053.
Jianqiu shi,et al:Solar Energy Materials and Solar Cells, 91(2007)1856.

* cited by examiner

*Primary Examiner* — Monique Peets
(74) *Attorney, Agent, or Firm* — IPUSA, PLLC

(57) ABSTRACT

Thermochromic microparticles including vanadium dioxide ($VO_2$) particles of a rutile crystal phase (R phase), and titanium dioxide ($TiO_2$) particles of the rutile crystal phase (R phase), wherein at least one of the vanadium dioxide ($VO_2$) particles of a rutile crystal phase (R phase) is grown like a rod on the titanium dioxide ($TiO_2$) particles to be larger than sizes of the titanium dioxide ($TiO_2$) particles.

9 Claims, 19 Drawing Sheets

THERMOCHROMIC MICROPARTICLES, DISPERSIONS THEREOF, AND MANUFACTURING METHOD THEREOF, AS WELL AS LIGHT-MODULATING COATINGS, LIGHT-MODULATING FILMS AND LIGHT-MODULATING INKS

TECHNICAL FIELD

The present invention relates to microparticles and a dispersion liquid thereof. Particularly, microparticles containing vanadium dioxide ($VO_2$) of a rutile crystal phase and a dispersion liquid thereof. The present invention relates to a manufacturing method of the microparticles, a light-modulating paint, a light-modulating film, and a light-modulating ink containing the microparticles.

BACKGROUND ART

Application of an automated light modulating material is expected in order to commonly realize energy saving and amenity in a portion such as a window glass in which great heat exchange occurs between an internal environment and an exterior environment of a room and a building such as a housing and a movable body such as a car (for example, Patent Document 1).

An "automated light modulating material" is enabled to control optical characteristics such as a transparent or reflecting state with a temperature. For example, when the automated light modulating material is applied to a window glass of a building, a solar light is reflected and heat is shielded by reflecting a solar light. Heat is absorbed by causing a solar light to transmit through the window glass.

One of the automated light modulating materials which are of most interest contains vanadium dioxide ($VO_2$). The material uses thermochromic characteristics in which optical characteristics are reversibly changed by a temperature and which occurs when a phase transition occurs between a semiconductor phase of vanadium dioxide ($VO_2$) and a metallic phase. The light modulating characteristics of an ambient temperature depending type are obtainable with this.

A glass containing the automated light modulating material may be obtained by a sputtering process of vanadium dioxide ($VO_2$) to, for example, a glass substrate. After sputtering a thin film of vanadium dioxide ($VO_2$) on a substrate, the thin film is transferred to a film, and the thin film transferred to the film is transferred to a final glass substrate. Then, a glass containing an automated light modulating material is obtainable (For example, Patent Documents 2 and 3).

However, under a forming method of an automated light modulating material using a sputtering process, it is necessary to heat a substrate so as to be a temperature of 400° C. Therefore, there is a problem that a manufacturing process is complicated and a cost increases. Further, there is a problem that application of a sputtering process to the window glass to an existing building is difficult.

As another method, the microparticles and dispersion liquid containing vanadium dioxide ($VO_2$) are prepared, and installed in a member to which an automatic light-modulating property is given via a binding material. With this, manufacturing of the member having an automatic light-modulating property is considered (for example, Patent Documents 4-6).

RELATED ART

Patent Documents

[Patent Document 1] Japanese Patent No. 2735147
[Patent Document 2] Japanese Patent No. 3849008
[Patent Document 3] Japanese Laid-open Patent Publication No. 2007-326276
[Patent Document 4] Japanese National Publication of International Patent Application No. H10-508573
[Patent Document 5] Japanese Laid-open Patent Publication No. 2004-346260
[Patent Document 5] Japanese Laid-open Patent Publication No. 2004-346261

Non-Patent Documents

[Non-Patent Document 1] Zhou Gui, et al: Chem. Mater. 14(2002)5053
[Non-Patent Document 2] Jianqiu shi, et al: Solar Energy Materials and Solar Cells, 91(2007)1856

DISCLOSURE OF THE INVENTION

Problems to be Solved by the Invention

The vanadium dioxide ($VO_2$) materials have several crystal phases such as an A phase, a B phase, and a rutile phase. However, a crystal structure exhibiting the above-mentioned automatic light-modulating property is limited to the rutile crystal phase (hereinafter, referred to as "R phase"). The R phase has a structure of monoclinic system at a transition temperature or less. Therefore, it is also called M phase. In order to demonstrate a substantially significant automatic light-modulating property in vanadium dioxide ($VO_2$) particles, a particle size in the R phase is on the order of submicron or less.

In the technique described in Patent Documents 4 to 6, a precursor of vanadium dioxide ($VO_2$) is first synthesized from a solution containing vanadium ions, the precursor is subjected to reduction firing at a high temperature of for example 350 to 650° C. or thermally decomposed whereby vanadium dioxide ($VO_2$) particles of R phase are prepared.

However, when the heat treatment at the high temperature is carried out, the particles may clump together. With this method, the size of finally obtainable vanadium dioxide ($VO_2$) is on the order of micron or more. Therefore, the vanadium dioxide ($VO_2$) particles obtained as described has problems in which the light-modulating characteristics are not obtainable or extremely deteriorated.

Recently, several reports are given of a manufacturing method of vanadium dioxide ($VO_2$) microparticles using hydrothermal reactivity (Non-patent Documents 1 and 2). However, according to Non-patent Documents 1 and 2, a precursor of the microparticles of the obtained vanadium dioxide ($VO_2$) are in the A or B phase or an amorphous phase. In order to convert the obtained particles to the R phase, an additional process such as a reduction firing becomes necessary.

However, since the particles clump together as described when the microparticles are subjected to heat treatment because of the reduction firing, it is extremely hard to finally obtain microparticles on the submicron order. Therefore, there occurs a problem that light modulating property deteriorates in the microparticles containing $VO_2$ obtained by the above-mentioned method.

The present invention is provided in consideration of the above problems. Objects of the present invention are to provide microparticles containing the vanadium dioxide ($VO_2$) particles of the R phase and having a good automatic light-modulating property and a dispersion liquid thereof. Objects of the present invention are to provide a manufacturing method of the microparticles, a light-modulating paint, a light-modulating film, and a light-modulating ink containing the microparticles.

Means for Solving the Problems

The present invention provides thermochromic microparticles including particles of vanadium dioxide ($VO_2$) of the rutile crystal phase (R phase) and particles of titanium dioxide ($TiO_2$) of the rutile crystal phase (R phase). At least one of the particles of vanadium dioxide ($VO_2$) is larger than the particle of titanium dioxide ($TiO_2$) and grows like a rod on the particle of the titanium dioxide ($TiO_2$).

The thermochromic microparticles of the present invention may further contain particles of anatase titanium dioxide ($TiO_2$).

The thermochromic microparticles of the present invention may further contain at least one element selected from the elements of a group including tungsten (W), molybdenum (Mo), niobium (Nb), tantalum (Ta), tin (Sn), rhenium (Re), iridium (Ir), osmium (Os), ruthenium (Ru), germanium (Ge), chromium (Cr), iron (Fe), gallium (Ga), aluminum (Al), fluorine (F), and phosphorus (P).

The contained amount of the at least one of the elements may be in a range of 0.1 to 5.0 atomic % relative to vanadium contained in the thermochromic microparticles.

The weight ratio of the amount of the vanadium dioxide ($VO_2$) particles and the amount of the titanium dioxide ($TiO_2$) particles may be in a range of 5:95 to 95:5 in the thermochromic microparticles of the present invention.

In the thermochromic microparticles of the present invention, the contained amount of the vanadium dioxide ($VO_2$) may be in a range of 5 to 95 wt % relative to the entire thermochromic microparticles.

The thermochromic microparticles of the present invention may have an average size in a direction vertical to a longitudinal axis of the rod on the order of submicron or less.

The thermochromic microparticles of the present invention may have an average size in a direction vertical to the longitudinal axis of the rod of 200 nm or less.

At least one of surfaces of the thermochromic microparticles may be subjected to a coating process and/or a surface modifying process.

The thermochromic microparticles of the present invention may have both the light-modulating characteristics and the photocatalytic characteristics.

With the present invention, the dispersion liquid containing the thermochromic microparticles having the above characteristics may be provided.

With the present invention, there is provided a manufacturing method of microparticles containing vanadium dioxide ($VO_2$) particles of the rutile crystal phase (R phase) including: (1) a step of preparing a solution containing a compound including vanadium and water; (2) a step of adding particles of titanium dioxide ($TiO_2$) having at lease a portion of the rutile crystal phase to the solution and preparing the suspension solution; and (3) a step of causing a hydrothermal reaction of the suspended solution and obtaining microparticles containing particles of vanadium dioxide ($VO_2$) of the R phase.

In the manufacturing method of the present invention, the compound containing vanadium may contain at least one of a group including divanadium pentoxide ($V_2O_5$), ammonium vanadate ($NH_4VO_3$), vanadyl oxalate hydrate ($VOC_2O_4 \cdot nH_2O$), vanadium oxide sulfate ($VOSO_4 \cdot nH_2O$), vanadium trichloride oxide ($VOCL_3$), and sodium metavanadate ($NaVO_3$).

The manufacturing method of the present invention may include a step of adding a reducing agent and/or an oxidation agent in steps (1) or (2).

The reducing agent and/or the oxidation agent may be at least one compound selected from a group including oxalic acid, acetic acid, formic acid, malonic acid, propionic acid, succinic acid, citric acid, amino acid, ascorbic acid, butyric acid, valeric acid, acidum benzoicum, acidum gallicum, aconitic acid, mellitic acid, acidum lacticum, malic acid, maleic acid, aconitic acid, glutaric acid, methanol, phenol, ethylene glycol, cresol, ethanol, dimethylformaldehyde, acetonitrile, acetone, ethyl acetate, propanol, butanol, hydrazine, hydrogen peroxide, acetyl hydroperoxide, chloramine, dimethyl sulfoxide, meta-chloroperbenzoic acid, and aqua fortis.

The manufacturing method of the present invention may further include a step of adding a pH conditioning agent in addition to steps (1) or (2).

The pH conditioning agent may be at least any one selected from a group of sulfuric acid, hydrochloric acid, nitric acid, phosphoric acid, boric acid, hydrofluoric acid, ammonium hydroxide, lithium hydroxide, sodium hydroxide, magnesium hydroxide, and calcium hydroxide.

The manufacturing method of the present invention may include a step of adding at least one element selected from a group of tungsten (W), molybdenum (Mo), niobium (Nb), tantalum (Ta), tin (Sn), rhenium (Re), iridium (Ir), osmium (Os), ruthenium (Ru), germanium (Ge), chromium (Cr), iron (Fe), gallium (Ga), aluminum (Al), fluorine (F), and phosphorus (P) or a compound including the at least one element to the solution. The steps (1) or (2) may further includes a step of adding at least one element of the group including tungsten (W), molybdenum (Mo), niobium (Nb), tantalum (Ta), tin (Sn), rhenium (Re), iridium (Ir), osmium (Os), ruthenium (Ru), germanium (Ge), chromium (Cr), iron (Fe), gallium (Ga), aluminum (Al), fluorine (F), and phosphorus (P) or a compound containing the at least one element in the solution.

The above step (3) may be carried out at a temperature of 280° C. or less, at a temperature of 250° C. or less, and a temperature of 220° C. or less Further, the step (3) may be carried out in a time range between one hour and five days.

The manufacturing method of the present invention may further include (4) a step of processing or modifying surfaces of the microparticles after the step (3).

With the manufacturing method of the present invention, the amount of the vanadium dioxide ($VO_2$) particles is 5 to 95 weight percent relative to the entire weight of the microparticles.

Further, in the present invention, a light modulating paint, a light-modulating film, and a light-modulating ink containing the thermochromic microparticles having the above-mentioned property is provided.

A manufacturing method of thermochromic microparticles containing vanadium dioxide ($VO_2$) particles of a R phase and titanium dioxide ($TiO_2$) particles of the R phase including:
(1) a step of preparing a solution containing a compound including vanadium and water;
(2) a step of preparing a suspended solution by adding titanium dioxide ($TiO_2$) particles at least a part of which is the rutile crystal phase to the solution; and
(3) a step of causing the suspended solution to undergo a hydrothermal reaction,
wherein the thermochromic microparticles are obtainable, at least one of the vanadium dioxide ($VO_2$) particles larger than the titanium dioxide ($TiO_2$) particles grows on the titanium dioxide ($TiO_2$) particles, and a crystal axis of the at least one of the vanadium dioxide (VO$_2$) particles and a crystal axis of the titanium dioxide (TiO$_2$) match.

Effect of the Invention

With the present invention, there are provided microparticles containing vanadium dioxide (VO$_2$) particles of the R phase and having a good automatic light-modulating property and a dispersion liquid of the microparticles. The present invention is to provide a manufacturing method of the microparticles, a light-modulating paint, a light-modulating film, and a light-modulating ink containing the microparticles.

BEST MODE FOR CARRYING OUT THE INVENTION

Figure 1:
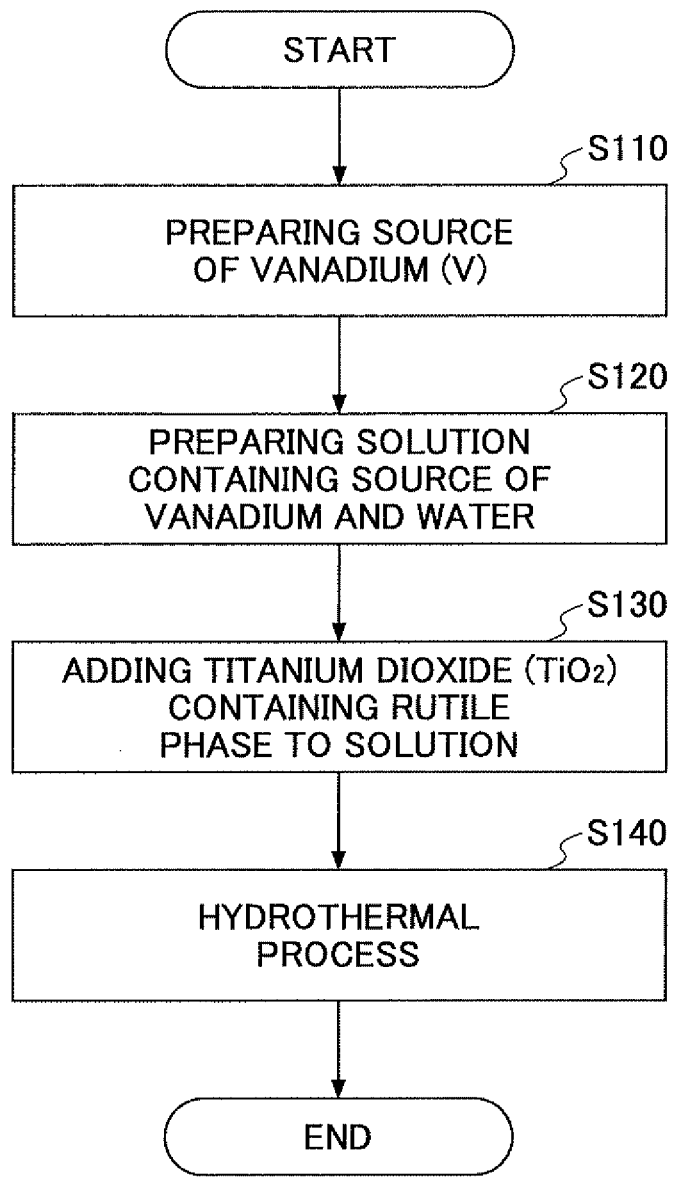
FIG. 1 is a flowchart of manufacturing microparticles of the present invention.

In order to obtain vanadium dioxide (VO$_2$) particles of the rutile crystal phase as described above, a precursor of vanadium dioxide (VO$_2$) is synthesized from a solution containing vanadium ions, and the precursor is subjected to heat treatment at a high temperature of 350° C. to 650° C. Another way is to prepare vanadium dioxide (VO$_2$) particles of A or B phase and provide a heat treatment at a high temperature of 350 to 650° C. thereby obtaining vanadium dioxide (VO$_2$) of the R phase using a hydrothermal reaction. The "hydrothermal reaction" means a chemical reaction caused in a hot water (subcritical water) having a temperature and a pressure lower than critical points (375° C. and 22 MPa) of water.

With these methods, the heat treatment at the high temperature is necessary and particles clump together during the heat treatment. Therefore, there is a problem that microminiaturization of the vanadium dioxide (VO$_2$) of the R phase to be finally obtained to an order of submicron is extremely difficult.

Under the above background, the inventors of the present application have found an event in which vanadium dioxide (VO$_2$) particles of the very minute R phase (for example, on the order of submicron) are directly formed when a hydrothermal reaction occurs when a vanadium compound and titanium dioxide (TiO$_2$) exist in an aqueous solution, and have reached the present invention.

In the present invention, without processing a post heat treatment, vanadium dioxide (VO$_2$) particles containing the R phase are obtainable when the titanium dioxide (TiO$_2$) particles in which a part of the rutile crystal phase is contained coexists without carrying out a conventional post heat treatment. Since the microparticles to be obtained are extremely minute on the order of submicron, a good light modulating property may be demonstrated without especially providing an additional process.

The reason why the microparticles containing the vanadium dioxide (VO$_2$) are directly obtainable by the hydrothermal reaction of the solution containing the vanadium compound and the titanium dioxide (TiO$_2$) of the rutile crystal phase is not sufficiently understood. However, one of the reasons is presumed to be an extreme proximity of lattice constants of the vanadium dioxide (VO$_2$) of the R phase and the titanium dioxide (TiO$_2$) of the rutile crystal phase. Said differently, the titanium dioxide (TiO$_2$) of the rutile crystal phase existing in the solution is presumed to function as a seed crystal which makes the vanadium dioxide (VO$_2$) of the R phase having the lattice constant proximate to that of the titanium dioxide (TiO$_2$) of the rutile crystal phase and finally to enable obtaining microparticles including many vanadium dioxide (VO$_2$) microparticles of the R phase.

Observing each of the microparticles of the present invention one on one with an electron scanning microscope (SEM), a TRANSMISSION electron microscope (TEM) or the like, most of the vanadium dioxide (VO$_2$) particles of the R phase grow like a rod along a crystal orientation the same as that of the titanium dioxide (TiO$_2$) of the rutile crystal phase. This is because the vanadium dioxide (VO$_2$) particles of the R phase show an epitaxial growth relative to the titanium dioxide (TiO$_2$) of the rutile crystal phase. With this, it is presumed that the titanium dioxide (TiO$_2$) of the rutile crystal phase functions as the seed crystal for growth of the vanadium dioxide (VO$_2$) of the R phase. For example, the length of the growth axis (longitudinal axis) of the vanadium dioxide (VO$_2$) particles shaped like a rod is about 1.5 to 5 times the length of the titanium dioxide (TiO$_2$) particles of the rutile crystal phase.

As a result of observation with an electronic microscope, there are two modes in growth of the vanadium dioxide ($VO_2$) particles of the R phase. One is a mode in which the vanadium dioxide ($VO_2$) of the R phase grows in one direction relative to the seed crystal of the titanium dioxide ($TiO_2$). The other is a mode in which the vanadium dioxide ($VO_2$) particles mutually grow in opposite directions relative to the seed crystal of the titanium dioxide ($TiO_2$) particles. In this case, the vanadium dioxide ($VO_2$) crystal of the R phase grows along a single growth axis on both sides of the seed crystal. In any of the modes, the crystal axis of the seed crystal matches the crystal axis of the crystal axis of the vanadium dioxide ($VO_2$) crystal of the R phase.

The microparticles of the present invention are on the order of submicron and have a mean particle diameter in a range of 50 to 250 nm. For example, when the mean particle diameter is 200 nm or less, especially 100 nm or less, an extremely good light modulating property is obtainable.

The mean particle diameter of the microparticles of the present invention is calculated as follows.

(i) A case where most of the particles is in a shape of rod. First, an electronic microscope (SEM) photograph of the microparticles is shot with a magnification of 10000 to 20000 times. Sizes of the rod-like particles in a direction vertical to longitudinal axes of the rod-like particles are measured at up to ten particles. The obtained sizes are averaged to obtain "mean particle diameter".

(ii) A case where most of the particles are not in the shape of a rod. First, an electronic microscope (SEM) photograph of the microparticles is shot with a magnification of 10000 to 20000 times. In the electronic microscope (SEM) photograph, ten particles of which sizes and shapes are most common are selected and "maximum lengths" of the particles up to 20 particles are measured. The "maximum lengths" are determined as outermost peripheral diameters of the microparticles when the selected microparticles have so-called isotropous shapes such as a substantial sphere, a substantial oval, and a substantial cube. The obtained ten "maximum lengths" are averaged to obtain a "mean particle diameter" of the microparticles.

In the present invention, it is necessary to recognize the mean particle diameter of the rod-like particles depend on the mean particle diameter of the titanium dioxide ($TiO_2$) particles of the rutile crystal phase first added as a raw material (hereinafter, referred to as "seed crystal")). When titanium dioxide ($TiO_2$) particles having a large mean particle diameter are used as the seed crystal, the size in a direction perpendicular to the longitudinal axis of the rod-like axis increases. When titanium dioxide ($TiO_2$) particles having a small mean particle diameter are used as the seed crystal, the size in a direction perpendicular to the longitudinal axis of the rod-like axis decreases. Therefore, it is possible to simply control the size of the obtained rod-like particles by changing the mean particle diameter of the seed crystal in the present invention.

In the microparticles of the present invention, a ratio of the amount of the vanadium dioxide ($VO_2$) particles and the amount of the titanium dioxide ($TiO_2$) particles (weight ratio of $VO_2:TiO_2$) are in a range of 5:95 to 95:5, more preferably in a range of 10:90 to 90:10. The amount ratio (weight ratio of $VO_2:TiO_2$) is, for example, 2:1.

The contained amount of the vanadium dioxide ($VO_2$) in the microparticles of the present invention is preferably in a range of 5 to 95 weight %, more preferably in a range of 10 to 95 weight %. The contained amount of the vanadium dioxide ($VO_2$) in the microparticles of the present invention is more preferably in a range of 50 weight % to 95 weight %. The contained amount of the vanadium dioxide ($VO_2$) in the microparticles is, for example, 67 weight %.

Further, the microparticles of the present invention may contain titanium dioxide ($TiO_2$) of an anatase crystal phase in addition to the titanium dioxide ($TiO_2$) particles of the rutile crystal phase and the vanadium dioxide ($VO_2$) of the R phase. With this, it becomes possible to give photocatalytic characteristics to the microparticles in addition to the light-modulating property.

In this case, a ratio between the rutile crystal phase and the anatase crystal phase contained in the titanium dioxide ($TiO_2$) particles is not specifically limited, and may be in a range of 5:95 to 95:5. Especially, in order to obtain preferable photocatalytic characteristics, it is preferable to set a weight ratio between the rutile crystal phase and the anatase crystal phase is in a range of 70:30 to 20:80, for example, 50:50. When the ratio is less than 70:30, it is not possible to give sufficient photocatalytic characteristics to the microparticles. In reverse, when the ratio is larger than 20:80, there is a provability in which sufficient amount of the vanadium dioxide ($VO_2$) of the R phase cannot be obtained.

The microparticles of the present invention may contain at least one element selected from the following substance group A including compounds thereof. Substance group A: tungsten (W), molybdenum (Mo), niobium (Nb), tantalum (Ta), stannum (Sn), rhenium (Re), iridium (Ir), osmium (Os), ruthenium (Ru), germanium (Ge), chrome (Cr), iron (Fe), gallium (Ga), aluminum (Al), fluorine (F), and phosphorus (P).

With this, it is possible to control a phase transition property (especially, a light-modulating temperature) of the microparticles. For example, although a transition temperature (light-modulating temperature) of a vanadium dioxide ($VO_2$) of a pure R phase is about 68° C., it is possible to reduce the transition temperature (light-modulating temperature) of the finally obtainable microparticles to a predetermined temperature when the substance selected from the substance group A is added. The total amount of the substance selected from the substance group A relative to the finally obtainable microparticles is about 0.1 to 5.0 atomic %, for example, 1.0 atomic %. When the total amount to be added is 5.0 atomic % or more, the light-modulating property of the microparticles may be extremely degraded.

At least a part of surfaces of the microparticles of the present invention may be provided with a coating process and/or a surface modifying process. With this, it becomes possible to protect surfaces of the microparticles, modify surface properties, or control optical characteristics.

When the microparticles of the present invention are dispersed in an organic solvent like alcohol or an inorganic solvent like water, it is possible to provide a dispersion liquid containing light-modulating microparticles.

(Method of Manufacturing Microparticles of the Present Invention)

Next, an example of a manufacturing method of microparticles of the present invention having the above features is described in reference to FIG. 1. The following manufacturing method is an example, and the microparticles of the present invention may be manufactured by other methods.

FIG. 1 is a flowchart of manufacturing microparticles of the present invention.

(1) First, as a material of the vanadium (V) source, any one of the following substances contained in a substance group B is prepared (step S110 of FIG. 1). Substance group B: divanadium pentoxide ($V_2O_5$), ammonium vanadate ($NH_4VO_3$), vanadyl oxalate hydrate ($VOC_2O_4 \cdot nH_2O$), vanadium oxide sulfate ($VOSO_4 \cdot nH_2O$), vanadium trichloride oxide ($VOCl_3$), and sodium metavanadate ($NaVO_3$).

(2) Next, the substance prepared in (1) and water are mixed to thereby prepare a solution (step S120 of FIG. 1). The "solution" may be a solution in which a vanadium source is solved or a suspension solution in which the vanadium source is not solved but is being suspended.

Further, it is possible to arbitrarily add an oxidation agent and/or a reducing agent. The pH conditioning agent may be arbitrarily added to the solution.

The oxidation agent and/or reducing agent is, for example, oxalic acid, acetic acid, formic acid, malonic acid, propionic acid, succinic acid, citric acid, amino acid, ascorbic acid, butyric acid, valeric acid, acidum benzoicum, acidum gallicum, aconitic acid, mellitic acid, acidum lacticum, malic acid, maleic acid, aconitic acid, glutaric acid, methanol, phenol, ethylene glycol, cresol, ethanol, dimethylformaldehyde, acetonitrile, acetone, ethyl acetate, propanol, butanol, hydrazine, hydrogen peroxide, acetyl hydroperoxide, chloramine, dimethyl sulfoxide, meta-chloroperbenzoic acid, or aqua fortis. As a matter of course, these substances may be a hydrate (similar in the following pH conditioning agent).

The pH conditioning agent may be a sulfuric acid, a hydrochloric acid, a nitric acid, a phosphoric acid, a boric acid, a hydrofluoric acid, ammonium hydroxide, lithium hydroxide, sodium hydroxide, potassium hydroxide, magnesium hydroxide, calcium hydroxide, and so on. One or plural compounds may be selected from compounds of these substances.

Descriptions of the oxidation agent, the reducing agent, and the pH conditioning agent are only one example and substances other than these may be selected.

(3) Next, titanium dioxide ($TiO_2$) particles containing the rutile crystal phase are prepared. Commercially supplied titanium dioxide ($TiO_2$) particles may be used. The titanium dioxide ($TiO_2$) particles prepared from a raw material containing titanium (Ti) other than titanium dioxide ($TiO_2$) may be used.

A mean particle diameter of the titanium dioxide ($TiO_2$) particles may be about 10 to 500 nm, more preferably 50 to 100 nm. By making the mean particle diameter of the titanium dioxide ($TiO_2$) be about 50 to 100 nm, it is possible to significantly microminiaturize the finally obtainable mean particle diameter of the finally obtainable microparticles to be, for example, 100 to 200 nm or less.

When photocatalytic characteristics are given to the finally obtainable microparticles, titanium dioxide ($TiO_2$) particles, a part of which is the anatase crystal phase, or the titanium dioxide ($TiO_2$) particles, a part of which is the rutile crystal phase, are used.

(4) Next, the titanium dioxide ($TiO_2$) prepared in (3) is added to the above-mentioned solution to thereby prepare the suspended solution in step S130 of FIG. 1. The amount of the added titanium dioxide ($TiO_2$) is not specifically limited. For example, a ratio ($VO_2:TiO_2$) between the amount of the vanadium dioxide ($VO_2$) converted from the weight of the vanadium source and the amount of the titanium dioxide ($TiO_2$) to be added may be in a range of 5:95 to 95:5. With this the weight of the titanium dioxide ($TiO_2$) contained in the finally obtainable microparticles may be about 5 wt % to 95 wt %. Especially, the ratio ($VO_2:TiO_2$) between the amount of the vanadium dioxide ($VO_2$) converted from the weight of the vanadium source and the amount of the titanium dioxide ($TiO_2$) to be added may be in a range of 10:90 to 90:10. In this case, the weight of the titanium dioxide ($TiO_2$) contained in the finally obtainable microparticles relative to all microparticles is about 10 wt % to 90 wt %. For example, a ratio ($VO_2:TiO_2$) between the amount of the vanadium dioxide ($VO_2$) converted from the weight of the vanadium source and the amount of the titanium dioxide ($TiO_2$) to be added may be 2:1.

(5) When necessary, at least one substance selected from a substance group C or a compound containing the one substance may be added to the suspended solution. Substance group C: tungsten (W), molybdenum (Mo), niobium (Nb), tantalum (Ta), stannum (Sn), rhenium (Re), iridium (Ir), osmium (Os), ruthenium (Ru), germanium (Ge), chrome (Cr), iron (Fe), gallium (Ga), aluminum (Al), fluorine (F), and phosphorus (P).

With this, it is possible to control a phase transition property (especially, a light-modulating temperature) of the finally obtainable microparticles.

(6) With use of the suspended solution prepared as described above, a hydrothermal reaction process is carried out in step S140 of FIG. 1. A hydrothermal reaction container such as an autoclave is ordinarily used in the hydrothermal reaction process. The process temperature is in a range of, for example, 200 to 300° C. Since titanium dioxide ($TiO_2$) particles containing the rutile crystal phase function as the seed crystal for the vanadium dioxide ($VO_2$) of the R phase, it is possible to form the microparticles having good light-modulating characteristics of good reproducibility at temperatures of 280° C., 250° C. or less, or 220° C. or less. The processing time changes depending on the amount of suspended solution, a process temperature, a process pressure, and a ratio between the amount of the vanadium compound and the amount of the titanium dioxide ($TiO_2$). The processing time is in a range of about 1 hour to 7 days, for example 24 hours. (7) When necessary, a coating process or a surface modifying process may be carried out to process surfaces of the obtained microparticles. With this, the surfaces of the microparticles are protected, and/or the microparticles with these surfaces modified are obtainable. Further, optical characteristics (light-modulating characteristics) of the microparticles can be controlled. The coating process or the surface modifying process may be carried out using a silane coupling agent.

(8) With the above-mentioned process, a solution containing the microparticles containing vanadium dioxide ($VO_2$) of the R phase is obtainable.

The present invention has a feature in which the microparticles containing the vanadium dioxide ($VO_2$) particles of the R phase are obtainable basically only with a hydrothermal reaction. The basic synthetic reaction is only one step of a hydrothermal reaction. Further, the microparticles to be obtained exist in the solution under a monodispersed state.

Thereafter, a product is filtered and retrieved. The retrieved product is washed and dried to thereby obtain the microparticles of the present invention. Instead of this, when a dispersion liquid in which the microparticles are dispersed in a predetermined solvent is provided, a solvent in the solution may be substituted by a predetermined solvent.

The mean particle diameter of the obtained microparticles is in a range of 50 to 250 nm, for example, about 100 nm.

In the example of the above-described manufacturing method of obtaining the microparticles containing vanadium dioxide ($VO_2$) of the R phase, (1) a solution containing water and a compound containing vanadium is prepared, the titanium dioxide ($TiO_2$) particles, at least a part of which is in the rutile crystal phase, are added to the solution later to prepare a suspended solution, and (3) the suspended solution is subjected to the hydrothermal reaction. However, the above description is an example, and the steps up to step S140 in FIG. 1 of the hydrothermal reaction process may be carried out in any order. For example, the microparticles of the present invention may be obtained by directly mixing a compound containing vanadium (V), titanium dioxide ($TiO_2$) particles, at least a part of which is in the rutile crystal phase, and water to thereby carry out a hydrothermal reaction using the compound liquid.

(Application of Microparticles of the Present Invention)

The microparticles and the dispersion liquid of the present invention may be applied to a light-modulating paint, a light-modulating film, and a light-modulating ink. For example, the light-modulating paint and the light-modulating ink can be easily prepared by adding the microparticles and the dispersion liquid of the present invention to an ordinary paint such as a commercially-supplied paint. The light-modulating film can be easily prepared by attaching the microparticles or the dispersion liquid of the present invention to a transparent film such as an ordinary resin film or a commercially-supplied resin film.

EMBODIMENTS

Next, the embodiments of the present invention are specifically described. However, the present invention is not limited to the embodiments.

(1) Embodiment 1

Vanadium pentoxide ($V_2O_5$, analytical grade manufactured by Wako Pure Chemical Industries, Ltd.), oxalic acid dihydrate ($(COOH)_2.2H_2O$, reagent of analytical grade manufactured by Wako Pure Chemical Industries, Ltd.), and purified water 200 ml in a molar ratio of 1:2:300 are mixed and agitated to prepare an aqueous solution. Further, for conditioning pH, a sulfuric acid of 1.5 ml is added to the aqueous solution.

Commercially-supplied titanium dioxide ($TiO_2$) particles (a purity of 99% or more, a mean particle diameter of 100 nm or less, and a rate of rutile crystal phase of 40% or more), are added to $V_2O_5$ with a weight percentage of 50% thereby obtaining a suspended solution.

The suspended solution is hermetically closed inside a commercially-supplied hydrothermal reactive autoclave manufactured by Sanai Kagaku Corporation, type HU-25 (an inner cylinder made of teflon ("teflon" is a registered trademark), and having a capacity of 25 ml is installed inside a body made of SUS) and held for 24 hours at a temperature of 220° C. to thereby cause a hydrothermal reaction. With this, microparticles under a monodispersed state are obtained in the solution.

After the obtained product is filtered and cleaned by water and ethanol, the obtained product is dried for 10 hours by a constant temperature dryer at a temperature of 60° C. for 10 hours to thereby obtain the microparticles. By replacing a solution which has been subjected to the hydrothermal reaction with ethanol, a dispersion liquid containing the microparticles (it is known that microparticles containing vanadium dioxide ($VO_2$) microparticles of the R phase are contained by the following analysis) is obtainable.

Next, an aqueous solution containing a silane coupling agent (KBM-603 manufactured by Shin-Etsu Chemical Co., Ltd.) of 5% is made, the microparticles obtained in the above-mentioned process are supplied to the aqueous solution, and surfaces of the microparticles are subjected to a silane coupling treatment. Thereafter, the microparticles are retrieved and dried for one hour at a temperature of 110° C.

A crystalline property of the obtained microparticles is evaluated by an X-ray diffracting (XRD) device of a X'Pert-MPD type manufactured by Royal Philips Electronics. The obtained microstructures of the microparticles are evaluated by a FE-SEM apparatus of a type S-400 manufactured by Hitachi, Ltd.

Further, the obtained microparticles are evenly painted on a commercially-supplied highly transparent adhesive transferring tape, and the painted tape is attached to a transparent resin film. With this, a light-modulating film sample having $VO_2$ microparticles is obtained. With a similar manner to this, the obtained microparticles are attached to a glass substrate to thereby obtain a light-modulating glass substrate sample (dimensions: length 25 mm×width 25 mm×thickness 1 mm) on which the $VO_2$ microparticles are installed.

With use of a spectral photometer having a heating attachment of a type of V-570 (190-2500 nm) manufactured by JASCO corporation, an optical transmission property of the light-modulating glass substrate sample are measured. The measurement temperatures are 20° C. and 80° C. Further, a temperature dependency of an infrared transmission factor of the light-modulating glass substrate sample is measured. The measurement is carried out at a wavelength of 2000 nm.

Figure 2:
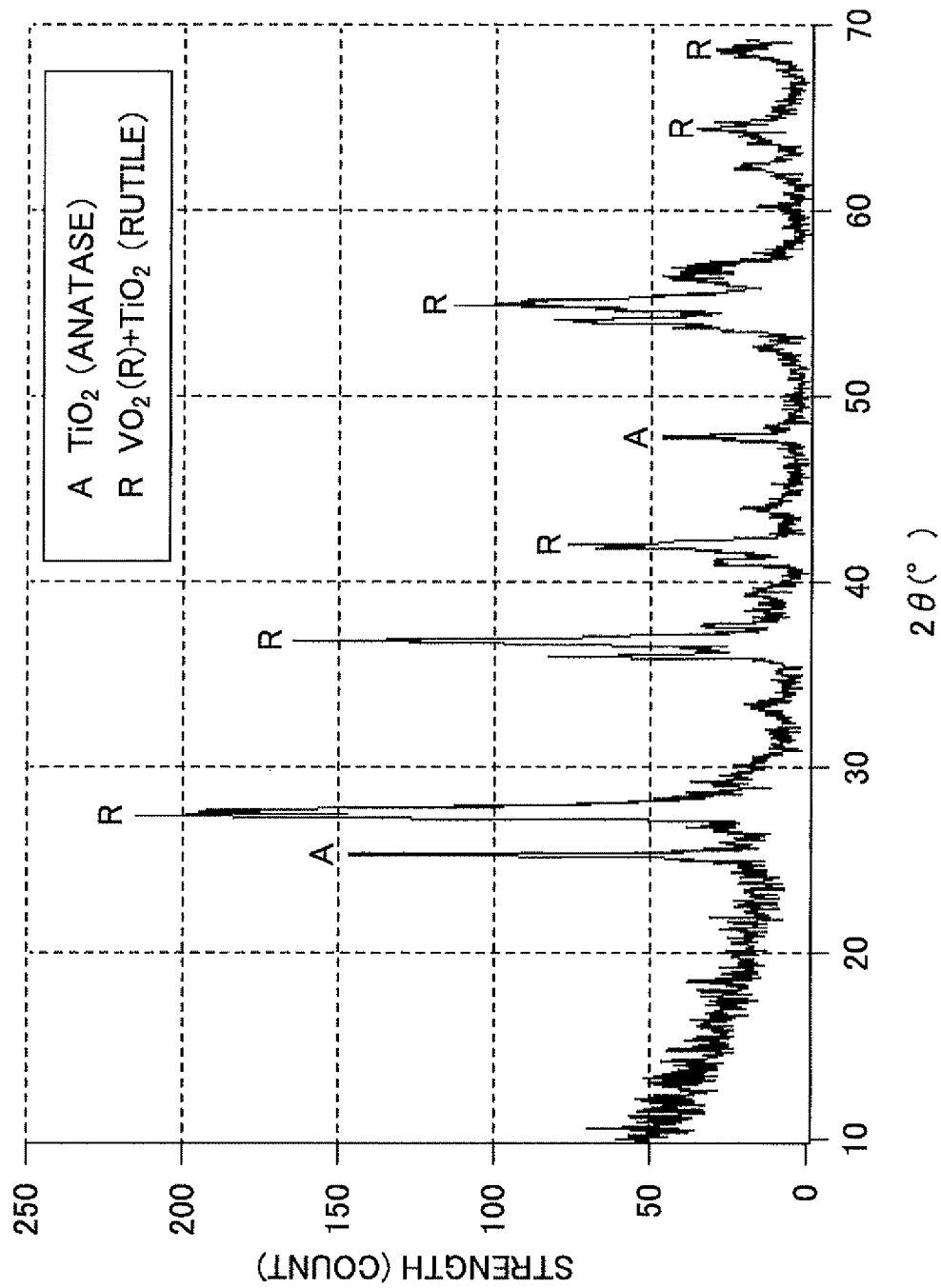
FIG. 2 is a XRD pattern of the microparticles of Embodiment 1.

The result of the XRD measurement is illustrated in FIG. 2. As illustrated in FIG. 2, it is confirmed that the obtained microparticles contain titanium dioxide ($TiO_2$) of the rutile crystal phase and vanadium dioxide ($VO_2$) of the rutile crystal phase (the rutile crystal phase is indicated by "R"). According to the obtained result, a peak of the titanium dioxide ($TiO_2$) of the anatase phase (indicated by "A") which appears to have been existing in the seed crystal is obtainable. The vanadium dioxide ($VO_2$) crystals of phases other than the rutile crystal phase, namely the A phase and B phase, are scarcely observed. With this, it is deduced that the obtained microparticles have extremely good light-modulating characteristics. Further, it is also deduced that photocatalytic characteristics are obtainable because the titanium dioxide ($TiO_2$) of the anatase type is contained in the microparticles.

Figure 3:
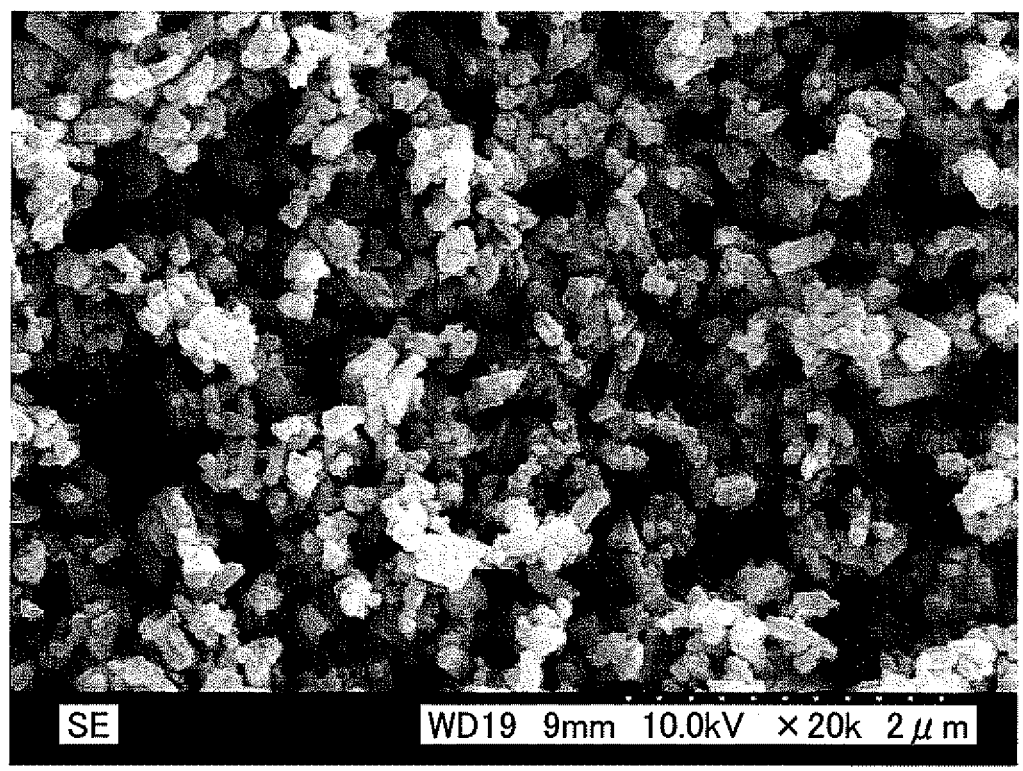
FIG. 3 is a SEM photograph of the microparticles of Embodiment 1.

FIG. 3 is a SEM photograph of the microparticles. Nanorods of vanadium dioxide ($VO_2$) of the R phase, having sizes larger than titanium dioxide ($TiO_2$) particles which have been grown using nano particles of titanium dioxide ($TiO_2$) of the rutile crystal phase and the titanium dioxide ($TiO_2$) particles as seed crystals, are confirmed. The vanadium dioxide ($VO_2$) is combined with the titanium dioxide ($TiO_2$) of the rutile crystal phase while the crystal axis of the vanadium dioxide ($VO_2$) and the crystal axis of the titanium dioxide ($TiO_2$) of the rutile crystal phase are aligned. The sizes of the nanorods in directions perpendicular to the crystal axes (growth axes) of the nanorods are on the order of nano. Around the rod-like particles, titanium dioxide ($TiO_2$) particles of the anatase type which do not contribute to the growth reaction of the vanadium dioxide ($VO_2$) of the R phase are dispersed while keeping their spherical shapes.

Figure 4:
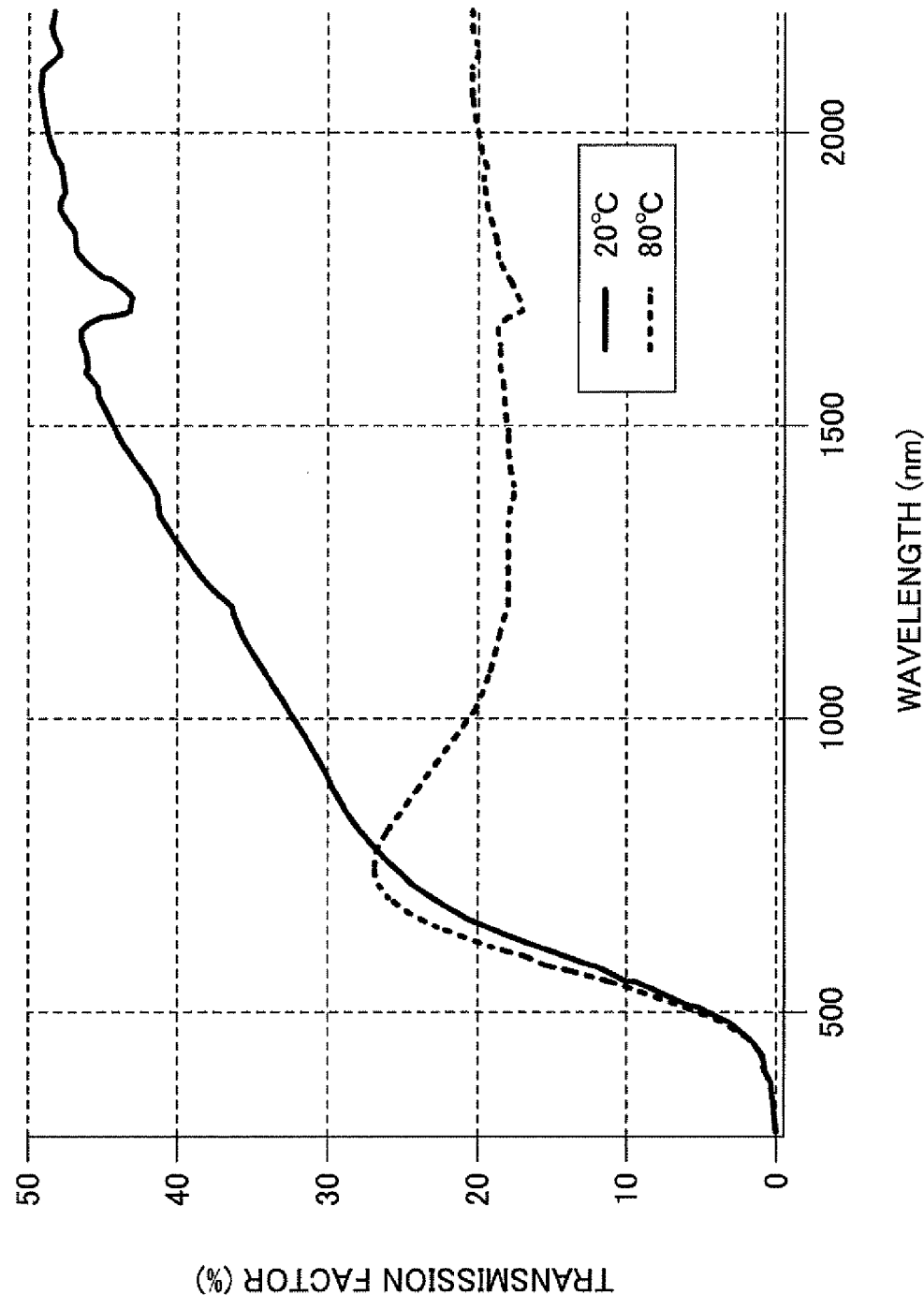
FIG. 4 illustrates a transmission property of a glass substrate pattern on which microparticles of Embodiment 1 are installed.
Figure 5:
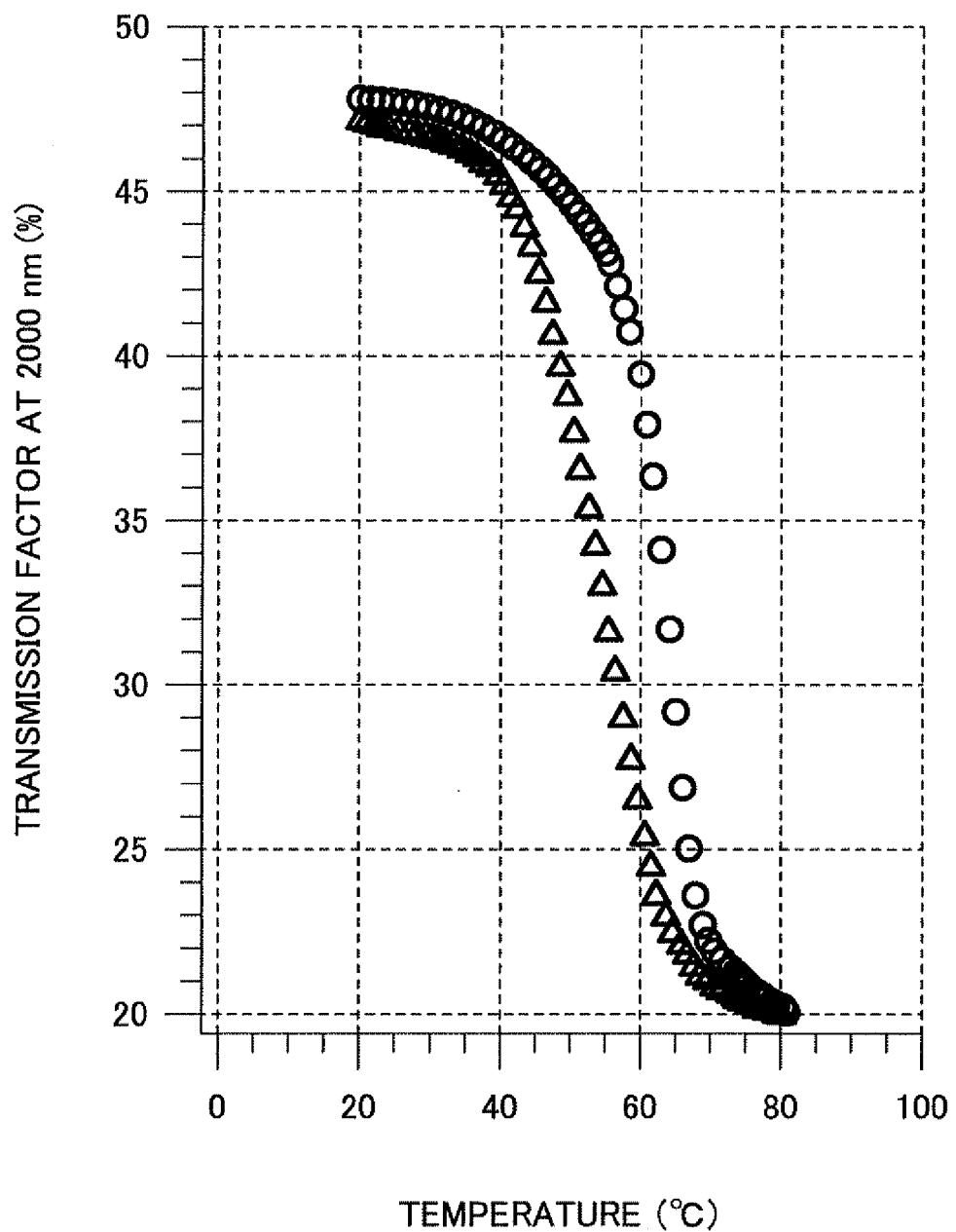
FIG. 5 illustrates temperature dependency of an infrared transmission factor of a glass substrate sample on which microparticles of Embodiment 1 are installed.

FIG. 4 illustrates a transmission property of a light-modulating glass substrate sample at temperatures of 20° C. and 80° C. It is known that along with an increment of temperature, the transmission factor largely changes and a good automatic light-modulating property emerges. FIG. 5 illustrates a temperature dependency of an infrared transmission factor at a wavelength of 2000 nm. With these results, it is confirmed that the infrared transmission factor of the sample drastically changes relative to the temperature change. The transition temperature of the sample is about 64° C.

(2) Embodiment 2

With Embodiment 2, the titanium dioxide of the rutile crystal phase which is prepared in an experimental laboratory is used as the seed crystal.

First, an aqueous solution of titanium tetrachloride ($TiCl_4$) having a Ti concentration of 16.5 wt % and a quantity of 10 ml is slowly dropped into a purified water of a quantity of 30 ml while agitating the water at a room temperature to thereby produce a dilute concentration of titanium chloride. The dilute concentration is moved to a glass beaker and capped. Then, the glass beaker is stored inside a constant temperature dryer for 6 hours at a temperature of 55° C. The product obtained after storing the beaker in the constant temperature dryer is filtered and is subjected to repeated cleaning with purified water. Thereafter, the product is dried. With this process, white titanium oxide powder is obtained. As a result of the XRD measurement, the obtained powder is confirmed to be titanium dioxide ($TiO_2$) of the rutile crystal phase.

Next, the titanium dioxide ($TiO_2$) powder of the rutile crystal phase is used as a seed crystal. Other processes are the same as the process of Embodiment 1. Thus, the microparticles of Embodiment 2 are obtained.

Figure 6:
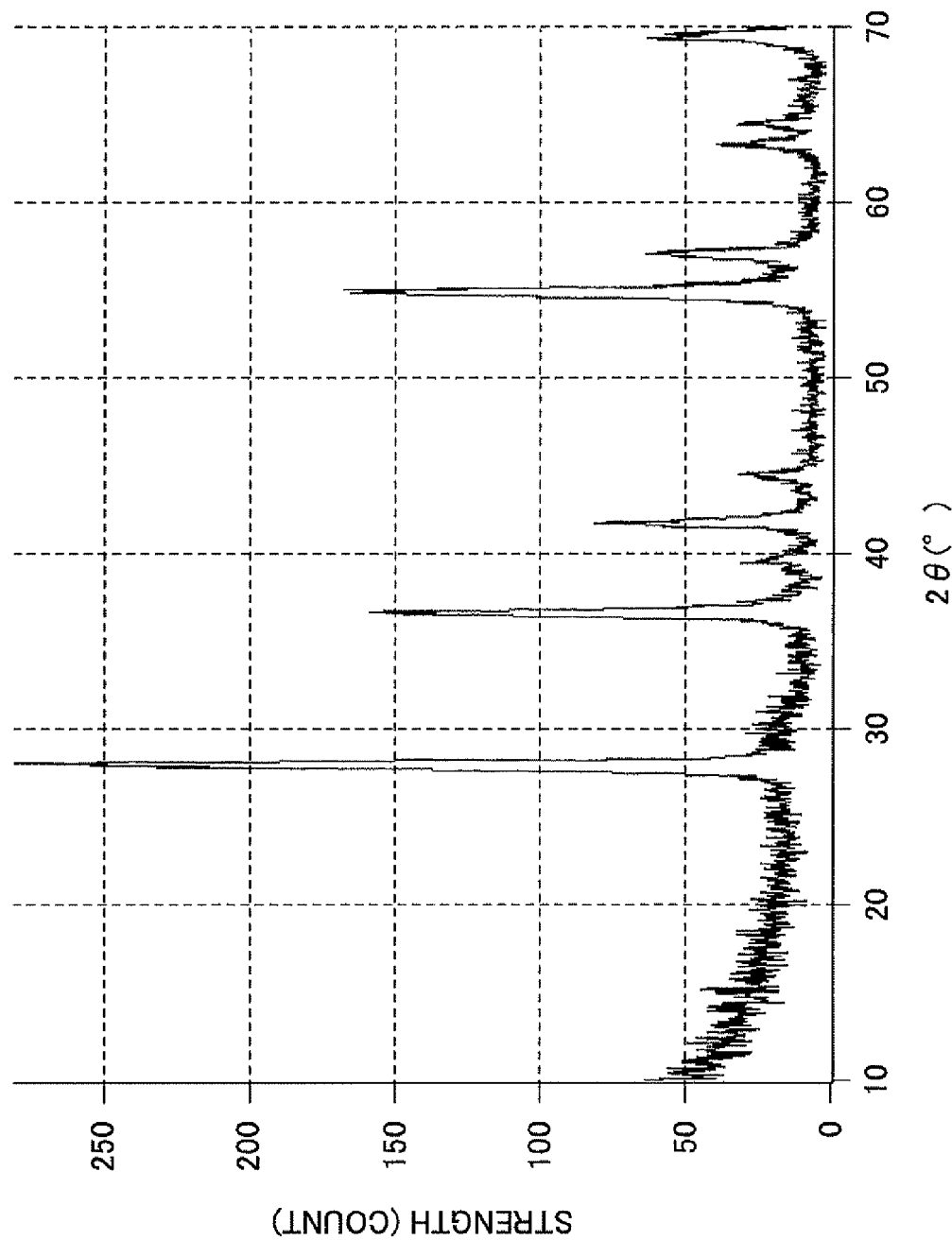
FIG. 6 is a XRD pattern of the microparticles of Embodiment 2.
Figure 7:
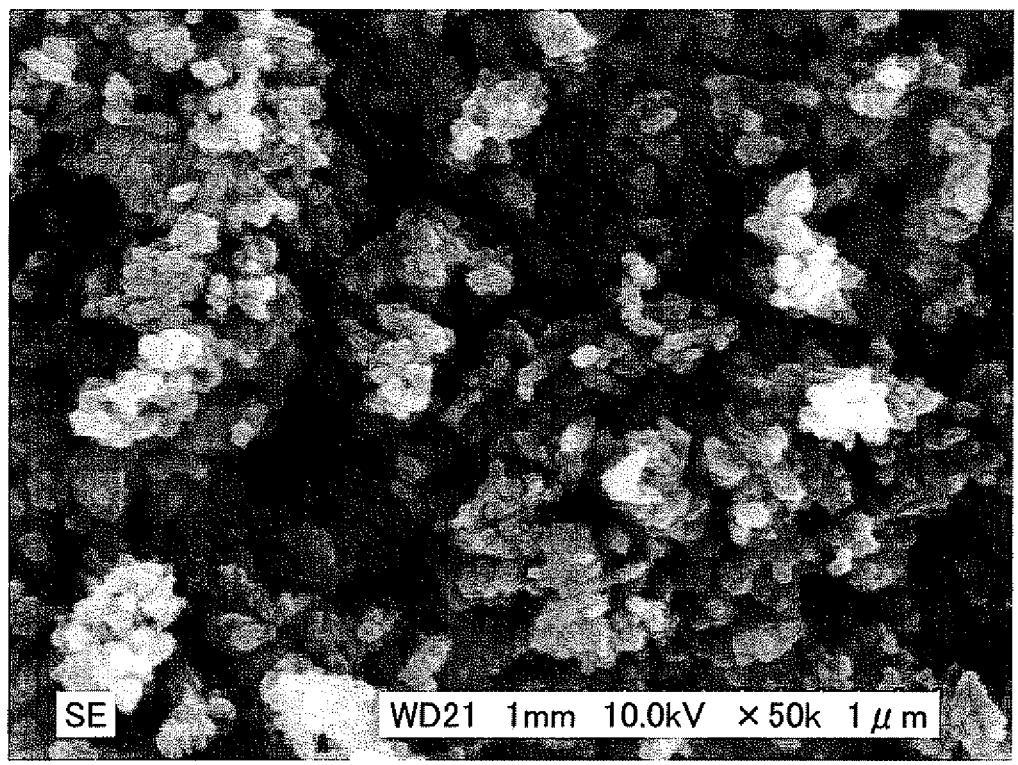
FIG. 7 is a SEM photograph of the microparticles of Embodiment 2.

FIG. 6 illustrates a measured result of microparticles with an XRD of Embodiment 2. Referring to FIG. 6, it is known that most of the microparticles is made of the titanium dioxide ($TiO_2$) of the rutile crystal phase and the vanadium dioxide ($VO_2$) of the R phase. FIG. 7 is a SEM photograph of the microparticles. It is observed that rod-like vanadium dioxide ($VO_2$) crystals having lengths of about 100 to 200 nm grow on particles of isotropic titanium dioxide ($TiO_2$) having sizes of about 30 to 50 nm.

(3) Embodiment 3

In Embodiment 3, the microparticles are prepared in a similar process to the above-mentioned Embodiment 1. In Embodiment 3, ammonium tungstate para pentahydrate (Wako Pure Chemical Industries, Ltd., substantially composed of $(NH_4) 10W_{12}O_{41}.5H_2O$) is dissolved in a solution containing vanadium pentoxide, oxalic acid dihydrate, and purified water, and a small quantity of sulfuric acid with an atomic ratio W:V of 1.0%.

Figure 8:
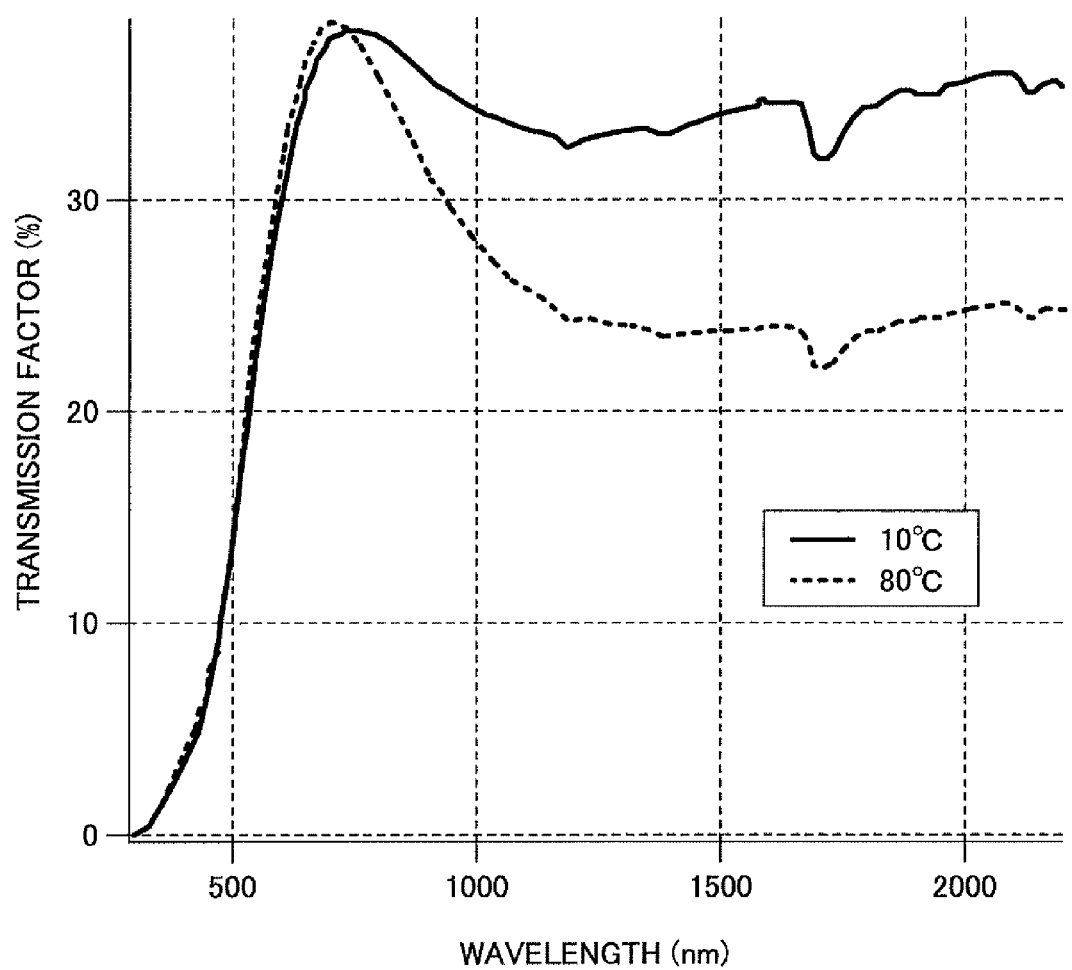
FIG. 8 illustrates a transmission property of a glass substrate sample on which microparticles of Embodiment 3 are installed.
Figure 9:
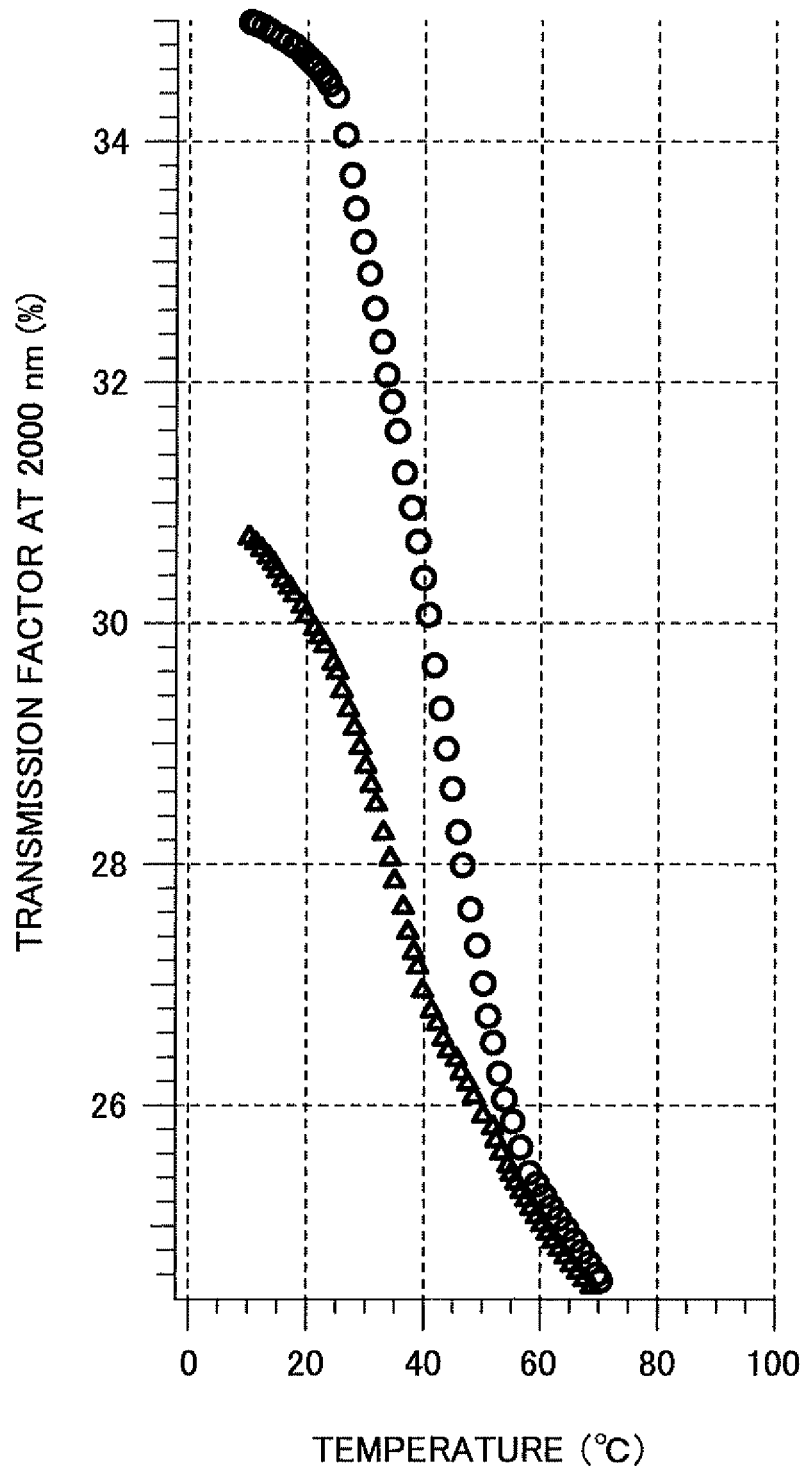
FIG. 9 illustrates temperature dependency of an infrared transmission factor of a glass substrate sample on which microparticles of Embodiment 3 are installed.

FIG. 8 illustrates an optical transmission property of a light-modulating glass substrate sample at temperatures of 10° C. and 80° C. It is confirmed that the transmission factor changes by a temperature change. FIG. 9 illustrates a measurement result of a temperature dependency of an infrared transmission factor in a wavelength of 2000 nm. As illustrated in FIG. 8, the transmission factor abruptly changes by a temperature increment. The transition temperature is about 41° C. and it is confirmed that the transition temperature decreases by adding tungsten.

(4) Comparative Example 1

In a similar manner to that of Embodiment 1 except for the no addition of seed crystal, particles of Comparative Example 1 are prepared.

Figure 10:
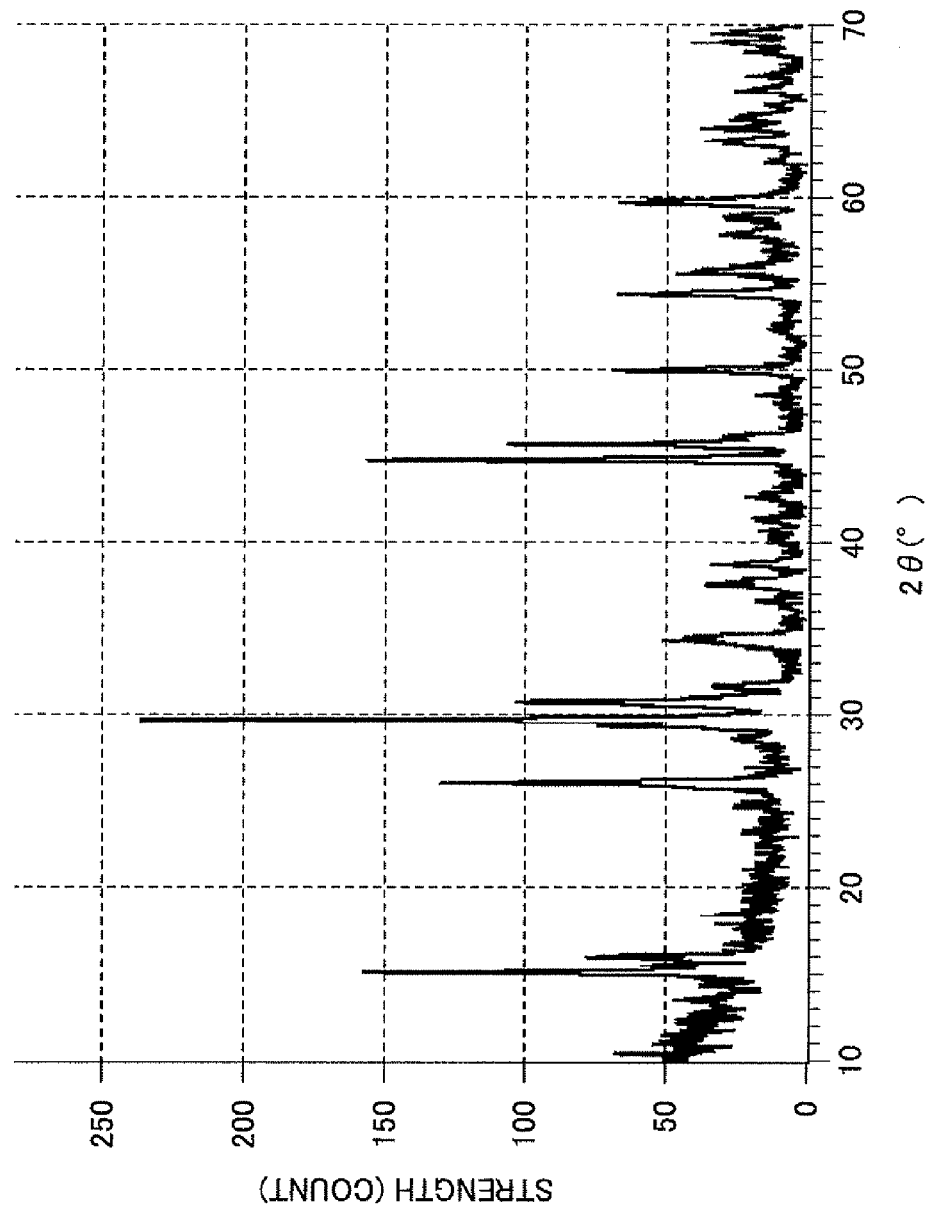
FIG. 10 illustrates a XRD pattern of microparticles related to Comparative Example 1.
Figure 11:
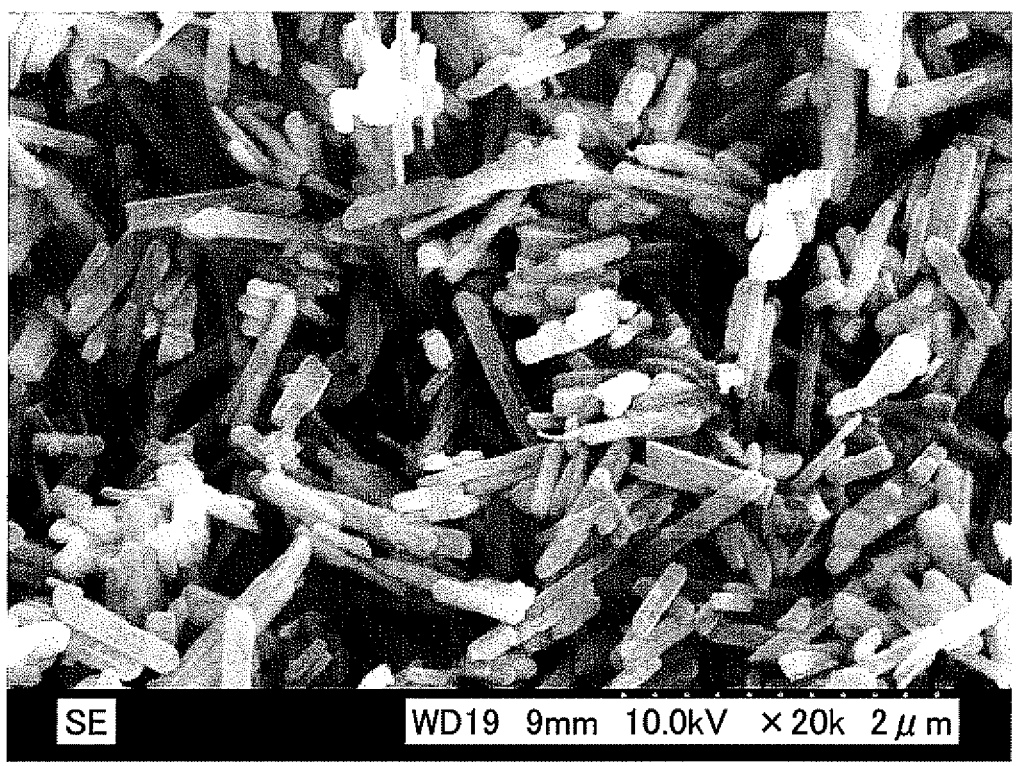
FIG. 11 is an SEM photograph of the microparticles of Comparative Example 1.

FIG. 10 illustrates an XRD measurement result of the obtained particles. FIG. 11 is an SEM photograph of the obtained microparticles of Comparative Example 1.

As illustrated in FIG. 10, the XRD pattern matching the B phase (JCPDS81-2393) of vanadium dioxide ($VO_2$) is confirmed, and the R phase pattern of vanadium, dioxide ($VO_2$) cannot be observed.

As illustrated in FIG. 11, rod-like or plate-like particles of vanadium dioxide ($VO_2$) being seemingly the B phase are observed as illustrated in FIG. 11. However, the particles of Comparative Example 1 did not show any change in the light-modulating characteristics. From this result, it is known that the vanadium dioxide ($VO_2$) microparticles of the rutile crystal phase are scarcely formed when titanium dioxide ($TiO_2$) is not mixed.

(5) Embodiment 4

First, vanadyl oxalate n-hydrate ($VOC_2O_4.nH_2O$ manufactured by Wako Pure Chemical Industries, Ltd.) of 0.81 gram, hydrogen peroxide (a reagent of an analytical grade manufactured by Wako Pure Chemical Industries, Ltd.) of 0.36 gram, commercially-supplied titanium oxide ($TiO_2$) microparticles having a high purity (a purity of 99.9% or more, a contained amount of that of the rutile phase of 99.9% or more, and an average mean particle diameter of about 200 nm) of 0.07 gram and purified water of 10 ml are stirred up to thereby obtain a suspended solution.

The suspended solution is hermetically closed inside a commercially-supplied hydrothermal reactive autoclave manufactured by Sanai Kagaku Corporation, type HU-25 (an inner cylinder made of teflon ("teflon" is a registered trademark) and having a capacity of 25 ml is installed inside a body made of SUS) and held for 16 hours at a temperature of 220° C. to thereby cause a hydrothermal reaction.

The obtained product is filtered and cleaned by purified water and ethanol. Thereafter, it is dried by a constant temperature dryer at a temperature of 60° C. for 10 hours to thereby obtain microparticles of vanadium dioxide ($VO_2$) and titanium dioxide ($TiO_2$) of which weight ratio of about 8:2. The obtained microparticles are evaluated by an X-ray diffracting (XRD) device of a X'Pert-MPD type manufactured by Royal Philips Electronics. The microstructure of the microparticles is evaluated by an electron scanning microscope (FE-SEM apparatus of a type S-4300 manufactured by Hitachi, Ltd. and a high-resolution transmission electron microscope of a type of JEM2010 manufactured by JEOL Ltd.)

The rod-like microparticles are analyzed using an energy dispersive X-ray (EDX) micro region composition analyzing apparatus attached to the electron scanning microscope.

Figure 12:
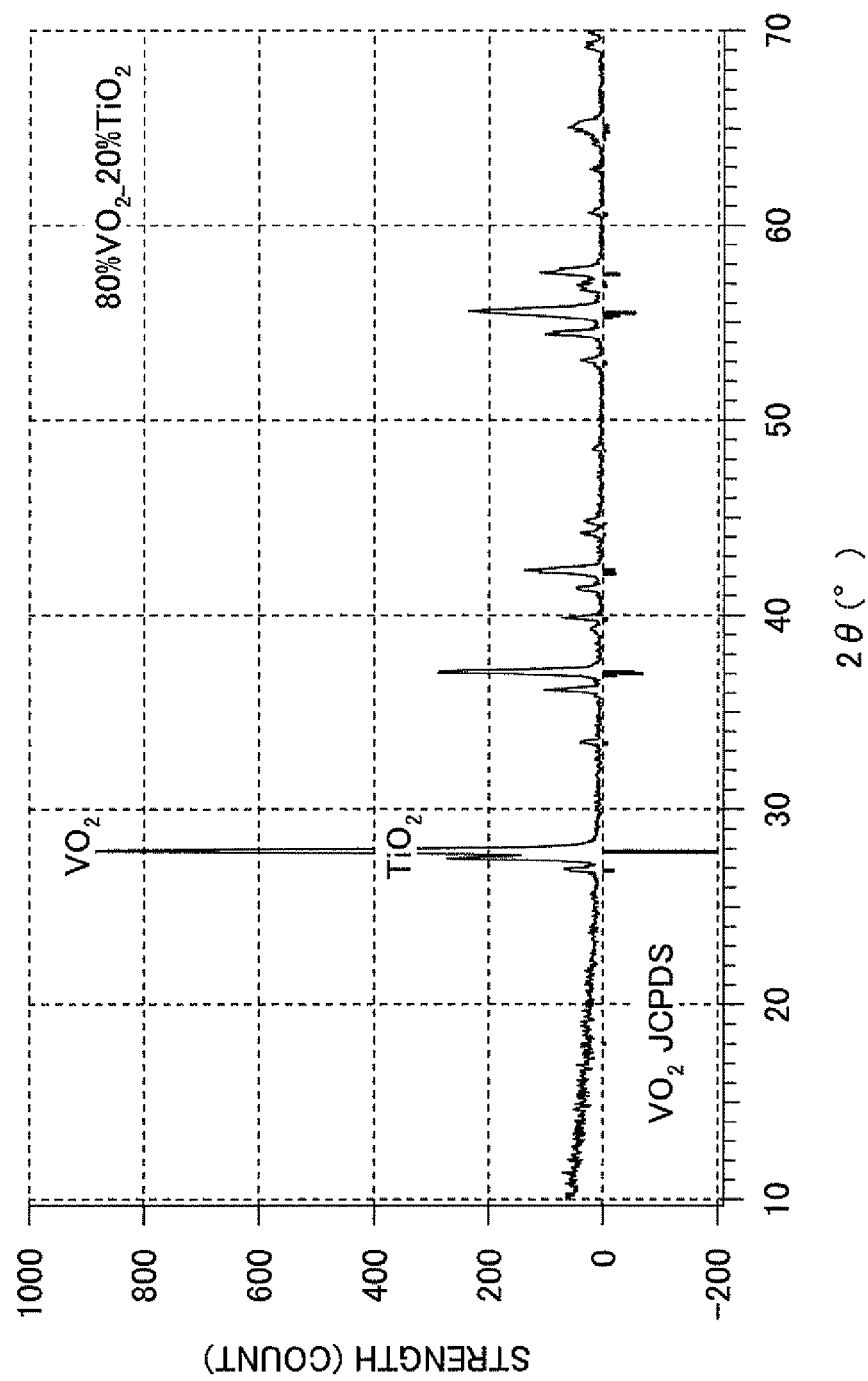
FIG. 12 illustrates a result of XRD measurement of particles of Embodiment 4.

FIG. 12 illustrates a result of the XRD measurement of the microparticles. As illustrated, the obtained diffraction peak matches well to that of vanadium dioxide ($VO_2$) crystal of the R phase. Further, a relatively low diffraction peak of titanium dioxide ($TiO_2$) of the rutile crystal phase is observed. The diffraction peak of titanium dioxide of the anatase type is not observed. In consideration of the strength of the diffraction peak and a small half width, it is inferred that a crystalline property of the formed vanadium dioxide of the R phase is excellent.

Figure 13:
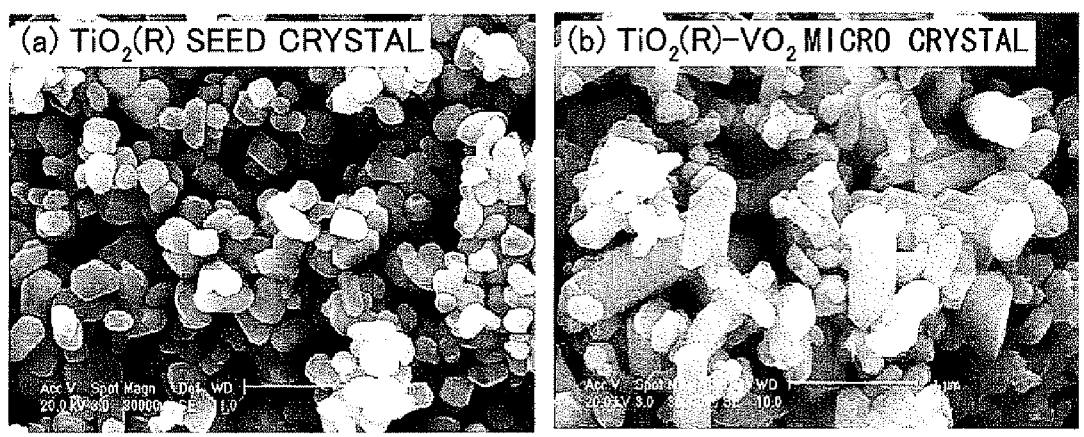
FIG. 13 are SEM photographs of the microparticles and titanium dioxide (TiO$_2$) used as a seed crystal of Embodiment 4.

FIG. 13 is a SEM photograph of the obtained microparticles. Referring to FIG. 13, (a) illustrates a mode of using the titanium dioxide ($TiO_2$) of the rutile crystal phase as the seed crystal, and (b) illustrates a mode of the finally obtained microparticles In comparison with the photos, it is known that the sizes and shapes of the titanium dioxide ($TiO_2$) scarcely change. On the other hand, the vanadium dioxide ($VO_2$) crystal greatly grows like a rod while the vanadium dioxide ($VO_2$) crystal is being connected to the titanium dioxide ($TiO_2$) particle of a core. The size of the vanadium dioxide ($VO_2$) crystal in the direction of the growth axis (a longitudinal axis of a rod) is several times larger than the size of the titanium dioxide ($TiO_2$).

Figure 14:
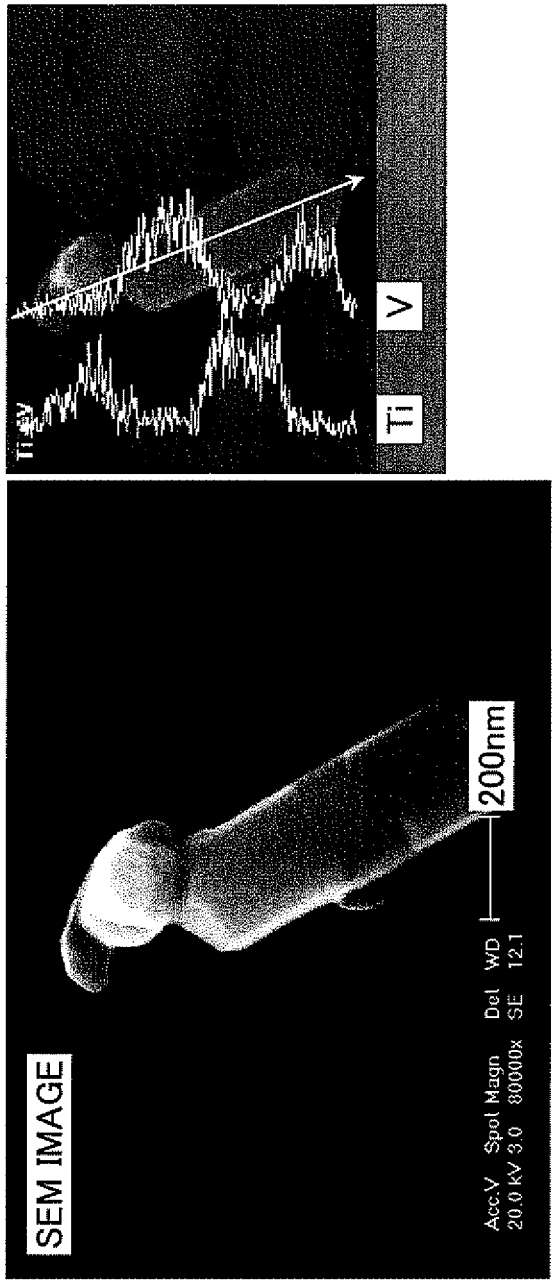
FIG. 14 illustrates a result of an elemental analysis for one crystal selected from the particles related to Embodiment 4.

FIG. 14 illustrates a result of an elemental analysis for one crystal selected from the obtained particles. Referring to FIG. 14, the left side photo is an enlarged SEM photo of the rod-like crystal used for analysis, and the right side photo illustrates a concentration distribution of titanium and vanadium along the longitudinal axis of the rod-like crystal along an arrow of FIG. 14.

It is known from the result of analysis that titanium dioxide ($TiO_2$) exists in a middle portion of the rod-like crystal and the vanadium dioxide ($VO_2$) crystal grows on both sides of the middle portion. Further, crystal axes of the vanadium dioxide ($VO_2$) and the titanium dioxide ($TiO_2$) match in the rod-like crystal. Therefore, the vanadium dioxide ($VO_2$) shows an epitaxial growth using the titanium dioxide ($TiO_2$) as the seed crystal.

Figure 15:
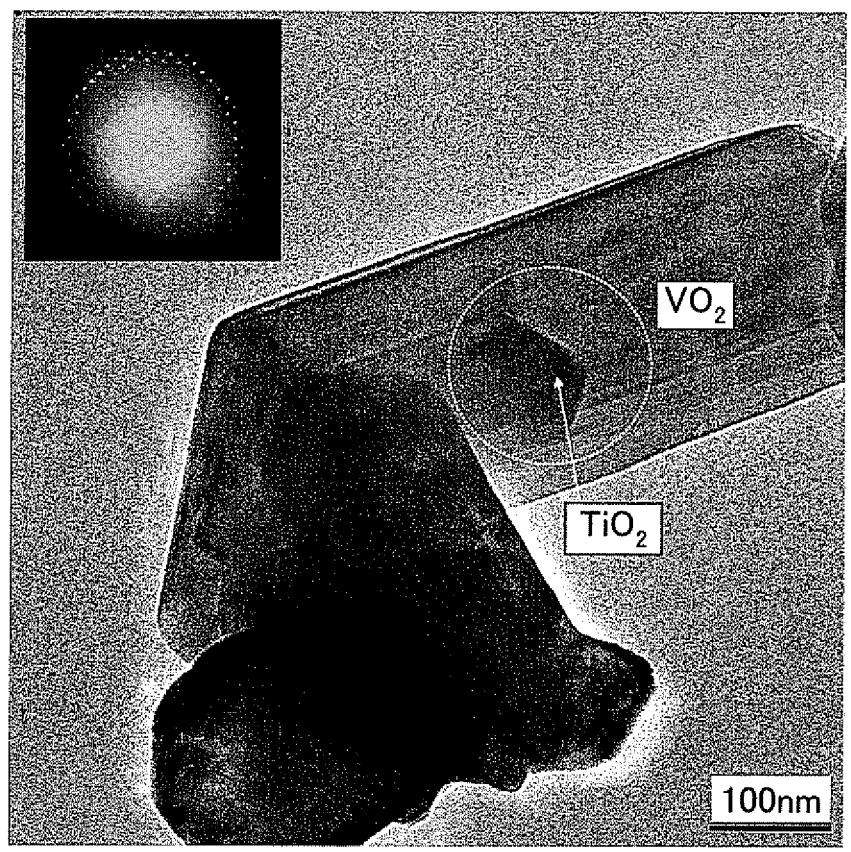
FIG. 15 illustrates a TEM photograph and an electron beam diffraction pattern for one crystal selected from the particles related to Embodiment 4.

FIG. 15 is a transmission electron microscope (TEM) photograph of the obtained microparticles. It is known from this photo and a result of the EDX analysis for micro regions that the seed crystal of titanium dioxide ($TiO_2$) which are well arranged exists inside vanadium dioxide ($VO_2$) particles which have been grown relatively large. With the electron beam diffraction pattern, it is confirmed that the microparticles are single crystals.

As clearly known from the comparison between FIG. 3 and FIG. 13, the size of the microparticles obtained in Embodiment 4 is significantly large in comparison with Embodiment 1 (FIG. 3 and FIG. 13 have substantially similar magnification ratios). This difference occurs by a difference of the mean particle diameters of the titanium dioxide ($TiO_2$) of the rutile crystal phase used in Embodiments 1 and 4. Said differently, the titanium dioxide ($TiO_2$) having the mean particle diameter of 100 nm is used in Embodiment 1 and the titanium dioxide ($TiO_2$) of the rutile crystal phase having the mean particle diameter of 200 nm is used in Embodiment 4 as the seed crystal. The difference is supposed to cause an effect on the sizes of the finally obtained microparticles. This means that the size of the finally obtainable thermochromic microparticles can be adjusted by changing the mean particle diameter of the titanium dioxide ($TiO_2$) of the rutile crystal phase as the seed crystal. In the present invention, there is an advantage that the size of the thermochromic microparticles can be easily adjusted.

(6) Embodiment 5

First, vanadyl oxalate n-hydrate ($VOC_2O_4 \cdot nH_2O$ manufactured by Wako Pure Chemical Industries, Ltd.) of 0.81 gram, hydrogen peroxide (a reagent of an analytical grade manufactured by Wako Pure Chemical Industries, Ltd.) of 0.36 gram, commercially-supplied titanium oxide ($TiO_2$) powder having a purity of 99.9% or more, an average mean particle diameter of 100 nm or less, and a weight ratio of the rutile phase of 40% or more and containing that of the anatase phase) of 0.15 gram, and ammonium tungstate para pentahydrate (($NH_4)10W_{12}O_{41} \cdot 5H_2O$ manufactured by Wako Pure Chemical Industries, Ltd.) of 0.00957 gram are dissolved in purified water of 10 ml to thereby obtain a suspended solution.

The suspended solution is hermetically closed inside a commercially-supplied hydrothermal reactive autoclave manufactured by Sanai Kagaku Corporation, type HU-25 (an inner cylinder made of teflon ("teflon" is a registered trademark) and having a capacity of 25 ml is installed inside a body made of SUS) and held for 16 hours at a temperature of 270° C. to thereby cause a hydrothermal reaction.

After the obtained product is filtered and cleaned by purified water and ethanol, the obtained product is dried by a constant temperature dryer at a temperature of 60° C. for 10 hours to thereby obtain the microparticles. Further, the obtained microparticles are evenly painted on a commercially-supplied highly transparent adhesive transferring tape, and the painted tape is attached to a transparent resin film. With this, a light-modulating film sample is obtained. With a similar manner to this, the obtained microparticles are attached to a glass substrate to thereby obtain a light-modulating glass substrate sample (dimensions: length 25 mm×width 25 mm×thickness 1 mm) on which the $VO_2$ microparticles are installed.

In a similar manner to Embodiment 1, an optical transmission property of the light-modulating glass substrate sample is measured. Further, a temperature dependency of an infrared transmission factor of the light-modulating glass substrate sample is measured. The measurement is carried out at a wavelength of 2000 nm.

Figure 16:
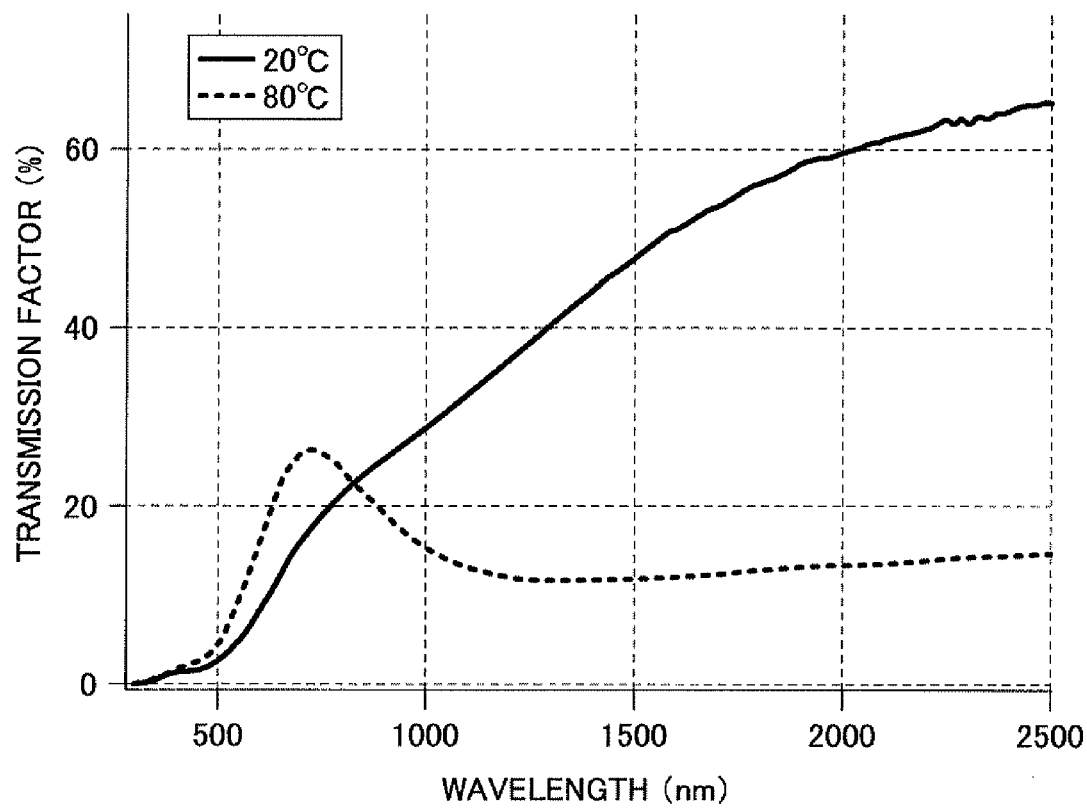
FIG. 16 illustrates a measurement result of optical transmission property of a light modulating glass sample containing microparticles of Embodiment 5 at temperatures of 20° C. and 80° C.

FIG. 16 illustrates an optical transmission property of a light-modulating glass substrate sample at temperatures of 20° C. and 80° C. A clear change of the transmission factor caused by a phase transition is observed.

Figure 17:
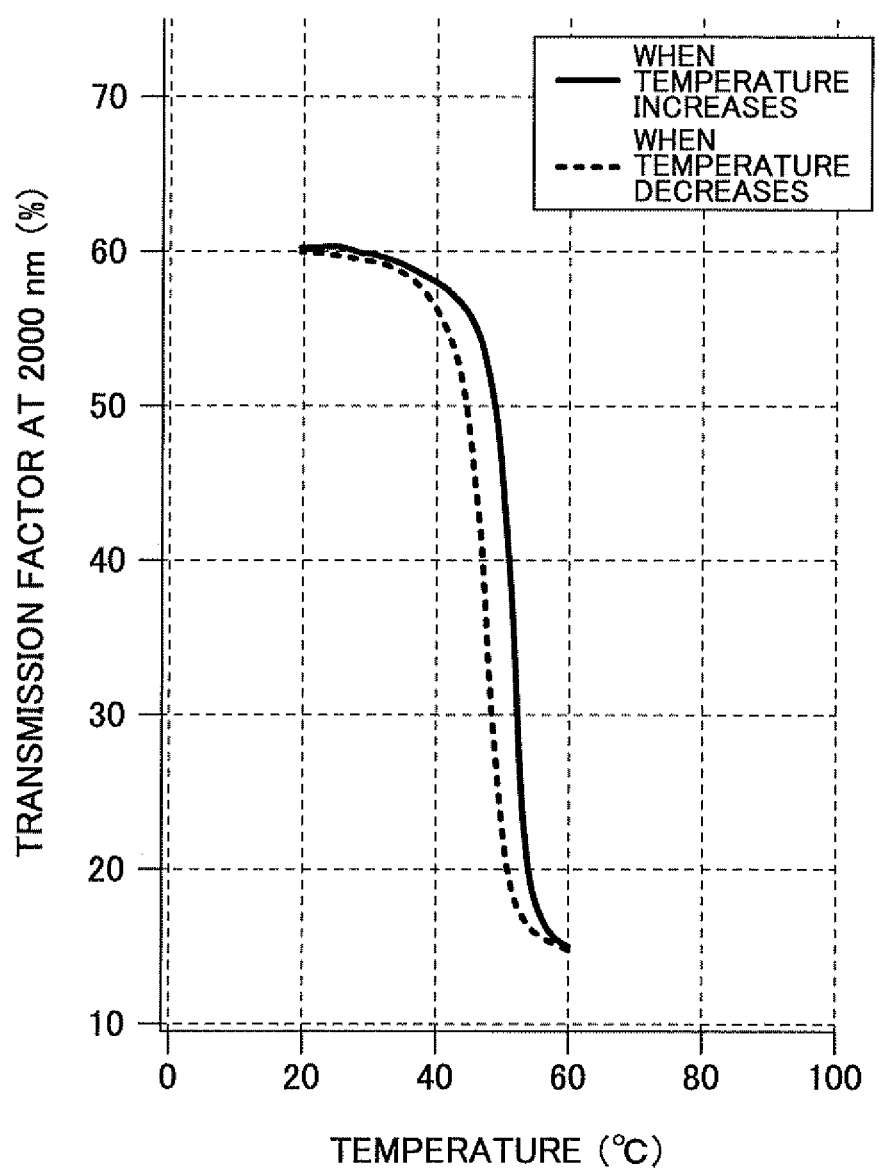
FIG. 17 illustrates temperature dependency of an infrared transmission factor of a glass substrate sample containing microparticles of Embodiment 5.

FIG. 17 illustrates a temperature dependency of the infrared transmission factor of the light-modulating glass substrate sample at a wavelength of 200 nm. As illustrated in FIG. 17, the transmission factor abruptly changes by a temperature increment. The transition temperature of the sample is about 50° C.

(7) Embodiment 6

Ammonium vanadate ($NH_4VO_3$) of 0.43 gram, oxalic acid dihydrate of 0.35 gram, titanium dioxide ($TiO_2$) of 0.15 gram containing the rutile phase in a rate of 40% or more, and purified water of 10 ml are closed inside an autoclave and held for 16 hours at a temperature of 270° C. to thereby cause a hydrothermal reaction. The other process is similar to that in Embodiment 5.

Figure 18:
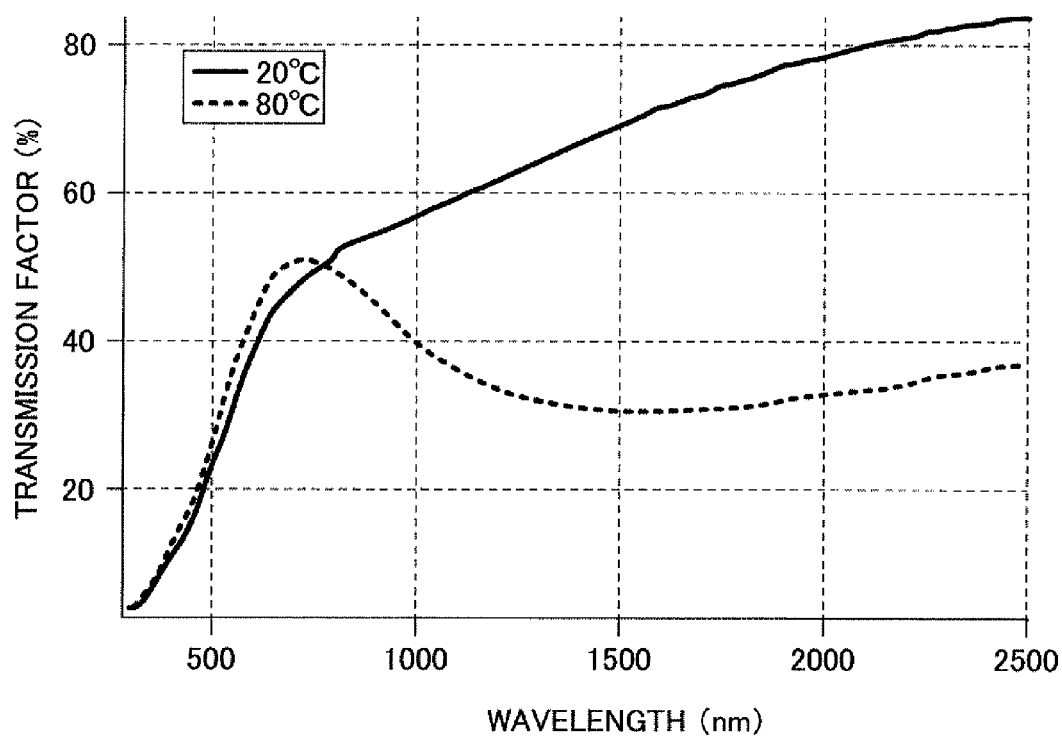
FIG. 18 illustrates a measurement result of optical transmission property of a light modulating glass sample containing microparticles of Embodiment 6 at temperatures of 20° C. and 80° C.

FIG. 18 illustrates an optical transmission property of a light-modulating glass substrate sample obtained by Embodiment 6 at temperatures of 20° C. and 80° C. As illustrated in FIG. 18, a clear change of the transmission factor caused by a phase transition is observed.

(8) Embodiment 7

With Embodiment 7, an aqueous ink containing thermochromic microparticles is experimentally produced.

A small amount of a solution provided with the hydrothermal reaction of the above Embodiment 6 is collected. The solution undergoes ultrasonic dispersion for about 20 minutes at ambient temperatures. Thereafter, purified water is added to the solution little by little while adjusting the concentration by visually observing the color of the solution to thereby finally obtain an aqueous ink having a transmission color of gold.

Then, thermochromic characteristics of the aqueous ink are evaluated.

First, two quartz cells are prepared. The aqueous ink is poured into one of the two quartz cells. Purified water is poured into the other one of the two quartz cells as a control solution. These two quartz cells are used to measure optical transmission properties of the aqueous inks at temperatures of 20° C. and 80° C. using a spectral photometer having a heating attachment of a type of V-570 (190-2500 nm) manufactured by JASCO corporation. As a result, there is a difference of 30% or more in the infrared transmission factor between the temperatures of 20° C. and 80° C. at a wavelength of 2000 nm.

The dispersed particles inside the inks are substantially small and not settled after leaving undisturbed for a long time.

The aqueous ink having the thermochromic characteristics may be applied to a medium such as a paper by coating, painting or printing.

(9) Comparative Example 2

In a similar process to that of Comparative Example 1, particles of Comparative Example 2 are prepared. However, in Comparative Example 2, titanium dioxide particles of the anatase type (a purity of 99.7% or more, ratio of the anatase phase is substantially 100%, and a mean particle diameter of about 100 nm) is used instead of the titanium dioxide ($TiO_2$) of the rutile crystal phase as the seed crystal. The titanium dioxide particles of the anatase type of a weight ratio of 50% are added relative to $V_2O_5$). A surface coating process is not carried out for the obtained microparticles by a silane coupling agent.

Figure 19:
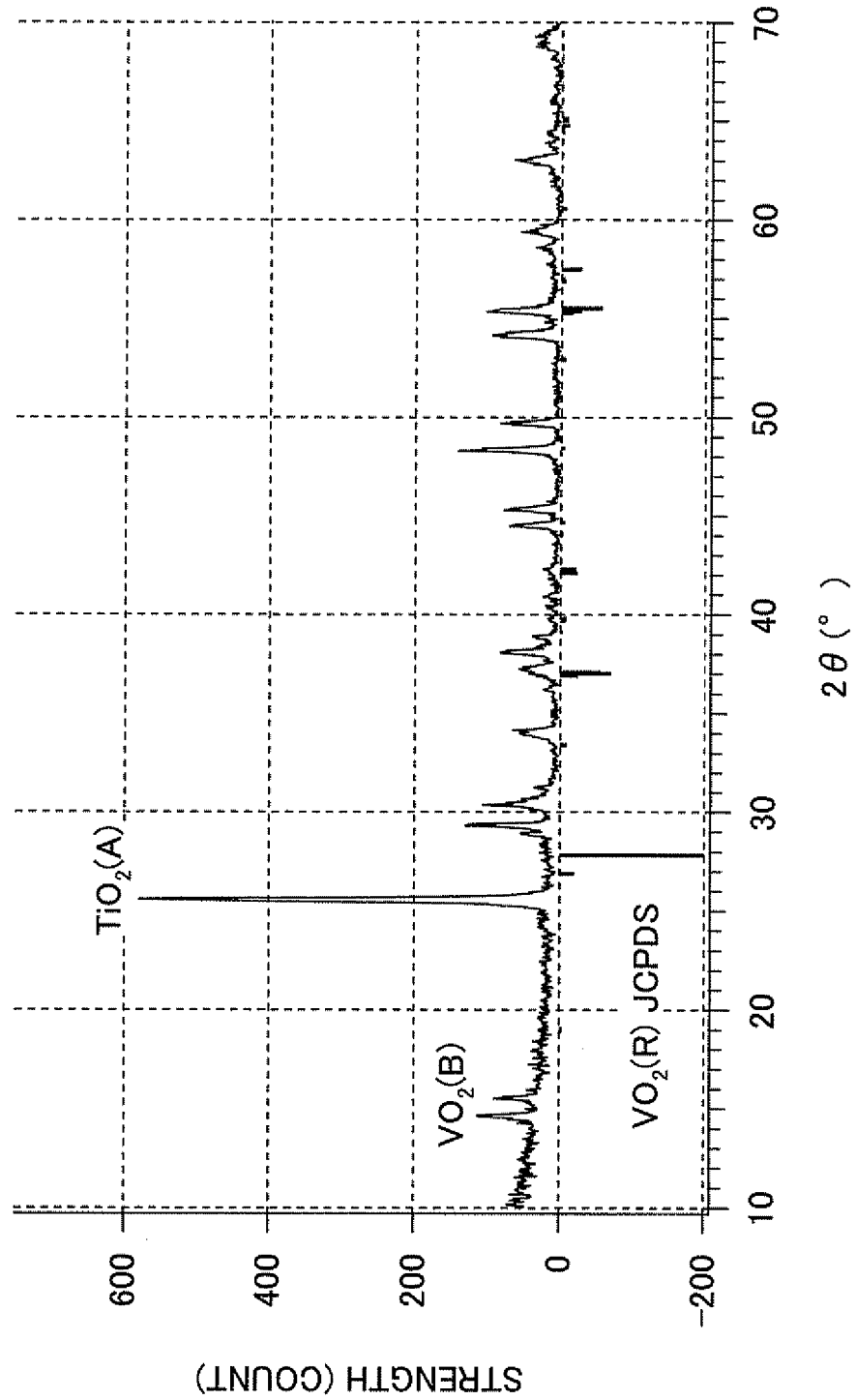
FIG. 19 illustrates a XRD pattern of microparticles related to Comparative Example 2.

FIG. 19 illustrates an XRD pattern of the obtained particles. The obtained peak corresponds to the titanium dioxide of the anatase type and the vanadium dioxide ($VO_2$) of the B phase, and the peak of the vanadium dioxide ($VO_2$) of the R phase is not recognized. With this, it is known that the vanadium dioxide ($VO_2$) of the R phase showing thermochromic characteristics are not formed when the seed crystal does not include the titanium dioxide ($TiO_2$) of the rutile crystal phase.

INDUSTRIAL APPLICABILITY

The present invention can be applied to an automatic light-modulating multifunction coating material, a resin film, an ink, a printed material, or the like. When the present invention is applied to windows of cars and buildings, tent materials, or an agricultural greenhouse film, it is possible to obtain control of infrared incident amount, overtemperature protection, or the like.

This patent application is based upon and claims the benefit of priority of the Japanese Patent Application No. 2008-171531 filed on Jun. 30, 2008 and the Japanese Patent Application No. 2009-102373 filed on Apr. 20, 2009, the entire contents of which are incorporated herein by reference.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

The invention claimed is:

1. Thermochromic microparticles comprising:
   vanadium dioxide ($VO_2$) particles of a rutile crystal phase (R phase), and
   titanium dioxide ($TiO_2$) particles of the rutile crystal phase (R phase) being a seed crystal for growth of the vanadium dioxide ($VO_2$),
   wherein at least one of the vanadium dioxide ($VO_2$) particles of the rutile crystal phase (R phase) is grown as a rod-like particle on the titanium dioxide ($TiO_2$) particles, and the vanadium dioxide ($VO_2$) particles grown as the rod-like particle are about 1.5 to 5 times longer than the titanium dioxide ($TiO_2$) particles of the rutile crystal phase along growth axes of the vanadium dioxide ($VO_2$) particles.

2. The thermochromic microparticles according to claim 1, further comprising:
   titanium dioxide of an anatase crystal phase ($TiO_2$).

3. The thermochromic microparticles according to claim 1, further comprising:
   at least one element selected from the group consisting of tungsten (W), molybdenum (Mo), niobium (Nb), tantalum (Ta), stannum (Sn), rhenium (Re), iridium (Ir), osmium (Os), ruthenium (Ru), germanium (Ge), chrome (Cr), iron (Fe), gallium (Ga), aluminum (Al), fluorine (F), and phosphorus (P).

4. The thermochromic microparticles according to claim 3, wherein a contained amount of the at least one of the elements is in a range of 0.1 to 5.0 atomic % relative to vanadium contained in the thermochromic microparticles.

5. The thermochromic microparticles according to claim 1, wherein a weight ratio between the quantity of the vanadium dioxide ($VO_2$) particles and the quantity of the titanium dioxide ($TiO_2$) particles is in a range of 5:95 to 95:5.

6. The thermochromic microparticles according to claim 1, wherein a contained amount of the vanadium dioxide ($VO_2$) relative to entire thermochromic microparticles is in a range of 5 to 95 wt %.

7. The thermochromic microparticles according to claim 1, wherein the average size of the thermochromic microparticles in the directions perpendicular to the longitudinal axis of the rod-like particle is 200 nm or less.

8. The thermochromic microparticles according to claim 1, wherein at least a part of surfaces of the thermochromic microparticles undergoes at least one of a coating process and a surface modifying process.

9. The thermochromic microparticles according to claim 1, wherein the thermochromic microparticles have both light-modulating characteristics and photocatalytic characteristics.

\* \* \* \* \*